United States Patent
Okutsu et al.

(10) Patent No.: US 9,090,729 B2
(45) Date of Patent: Jul. 28, 2015

(54) POLYMER, METHOD FOR PRODUCING POLYMER, RESIN COMPOSITION FOR OPTICAL MATERIAL, SHAPED ARTICLE, OPTICAL MATERIAL, AND LENS

(75) Inventors: Rie Okutsu, Ashigarakami-gun (JP);
Seiya Sakurai, Ashigarakami-gun (JP);
Tatsuhiko Obayashi, Ashigarakami-gun (JP); Hiroaki Mochizuki, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 793 days.

(21) Appl. No.: 13/213,699

(22) Filed: Aug. 19, 2011

(65) Prior Publication Data
US 2012/0046420 A1 Feb. 23, 2012

(30) Foreign Application Priority Data
Aug. 20, 2010 (JP) ................. 2010-185530

(51) Int. Cl.
| | |
|---|---|
| C08F 34/04 | (2006.01) |
| C08F 234/04 | (2006.01) |
| C08G 61/08 | (2006.01) |
| G02B 1/04 | (2006.01) |
| G02C 7/00 | (2006.01) |

(52) U.S. Cl.
CPC ............ *C08F 34/04* (2013.01); *C08F 234/04* (2013.01); *C08G 61/08* (2013.01); *G02B 1/04* (2013.01); *G02C 7/00* (2013.01)

(58) Field of Classification Search
CPC ........ C08F 34/04; C08F 234/04; C08G 61/08
USPC ....................................... 526/256
See application file for complete search history.

(56) References Cited

U.S. PATENT DOCUMENTS

| | | | |
|---|---|---|---|
| 3,330,815 A | | 7/1967 | McKeon et al. |
| 3,494,897 A | * | 2/1970 | Starcher et al. ............... 526/281 |
| 7,709,583 B2 | | 5/2010 | Okada et al. |
| 2005/0019638 A1 | * | 1/2005 | Ravikiran et al. ............... 429/33 |
| 2010/0160600 A1 | | 6/2010 | Sakurai |

FOREIGN PATENT DOCUMENTS

| | | | |
|---|---|---|---|
| JP | 2002293829 A | * | 10/2002 |
| JP | 2007-009178 A | | 1/2007 |
| JP | 2007-517967 A | | 7/2007 |
| JP | 2008-519882 A | | 6/2008 |
| JP | 2010-077280 A | | 4/2010 |
| JP | 2010-145959 A | | 7/2010 |
| WO | 2005/070993 A2 | | 8/2005 |
| WO | 2006/052091 A1 | | 5/2006 |
| WO | 2006/075646 A1 | | 7/2006 |

OTHER PUBLICATIONS

Machine translation of JP2002-293829, 2002.*
Agilent Technologies (Polymer Molecular Weight Distribution and Definitions of Mw Averages), 2011.*
Office Action mailed May 14, 2013 in Japanese Application No. 2010-185530.

* cited by examiner

*Primary Examiner* — Wenwen Cai
(74) *Attorney, Agent, or Firm* — Sughrue Mion, PLLC

(57) ABSTRACT

A polymer containing a recurring unit having an aliphatic polycyclic structure, wherein at least two atoms constituting the ring skeleton of the aliphatic polycyclic structure constitute the main chain of the polymer, and the recurring unit has an aliphatic ring containing a sulfonyl group as the constitutive group of the ring skeleton, has high refractivity, high Abbe's number, high-level heat resistance, high-level light transmittance and low water absorption.

12 Claims, No Drawings ated group of the ring skeleton thereof and to a method for producing the polymer, as well as to a resin composition for optical material, a shaped article, an optical material and a lens comprising the polymer. In particular, the invention relates to an optical material and a lens having a high refractivity, a high Abbe's number, a high-level heat resistance, a high-level light transmittance and a low water absorption, and to a resin material for producing them. The invention is applicable, for example, to optical parts such as lenses for spectacles, lenses for optical instruments, lenses for optoelectronics, laser lenses, pickup lenses, in-vehicle camera lenses, mobile camera lenses, digital camera lenses, OHP lenses, lenses constituting microlens arrays, etc.

POLYMER, METHOD FOR PRODUCING POLYMER, RESIN COMPOSITION FOR OPTICAL MATERIAL, SHAPED ARTICLE, OPTICAL MATERIAL, AND LENS

CROSS-REFERENCE TO RELATED APPLICATIONS

The present application claims the benefit of priority from Japanese Patent Application No. 2010-185530, filed on Aug. 20, 2010, the contents of which are herein incorporated by reference in their entirety.

BACKGROUND OF THE INVENTION

1. Field of the Invention

The present invention relates to an aliphatic ring-containing polymer that contains a sulfonyl group as the constitutive group of the ring skeleton thereof and to a method for producing the polymer, as well as to a resin composition for optical material, a shaped article, an optical material and a lens comprising the polymer. In particular, the invention relates to an optical material and a lens having a high refractivity, a high Abbe's number, a high-level heat resistance, a high-level light transmittance and a low water absorption, and to a resin material for producing them. The invention is applicable, for example, to optical parts such as lenses for spectacles, lenses for optical instruments, lenses for optoelectronics, laser lenses, pickup lenses, in-vehicle camera lenses, mobile camera lenses, digital camera lenses, OHP lenses, lenses constituting microlens arrays, etc.

2. Description of the Related Art

As compared with glass, a transparent resin material has various advantages in that it is excellent in lightweightness, impact resistance and shapability and is economical; and recently, resin is being much used for optical glass in the art of optical parts such as lenses and others.

One typical transparent thermoplastic resin material is a polycarbonate resin. In particular, a polycarbonate resin produced by the use of 2,2-bis(4-hydroxyphenyl)propane (generally called bisphenol A) as a starting material has many advantages in that it is excellent in transparency, more lightweight than glass and excellent in impact resistance and that it is applicable to industrial-scale mass-production of shaped articles as being able to be shaped in melt; and therefore the resin of the type is being much used as optical parts in various fields. The resin has a relatively high refractive index of 1.58 or so, but its Abbe's number indicating the degree of refractivity dispersiveness is around 30 and is low, or that is, the resin is poor in the balance between the refractivity and the dispersiveness characteristic thereof. At present, therefore, the resin is limited in point of the range of its applications to optical parts. For example, regarding lenses for spectacles that are one typical example of optical parts, it is known that the materials for those lenses preferably have an Abbe's number of at least 40 when the visibility function thereof is taken into consideration (Non-Patent Reference 1); and in case where a polycarbonate resin produced by the use of bisphenol A as a starting material is directly used for those lenses as it is, the lenses formed of the resin could hardly have the desired characteristics.

According to Non-Patent Reference 2, the aberration occurring inside the optical system of imaging instruments include monochromatic aberration such as spherical aberration, coma aberration, astigmatism, distortion and field aberration, and chromatic aberration. In particular, when chromatic aberration is large, then color fringing may be large with the result that the image quality of color images may greatly worsen. The non-patent reference says that the chromatic aberration of the type can be corrected by a combination of lenses where a lens having a high refractivity and a lens having a large Abbe's number are combined.

As an optical resin material having a large Abbe's number, known is a cyclic olefin resin comprising a total hydrocarbon. The Abbe's number of the cyclic olefin resin is from 50 to 57 or so and is relatively high, however, the refractive index thereof is not so high; and those of which both the Abbe's number and the refractive index are high are not as yet provided. With the recent tendency toward lightweight and small-sized portable appliances, materials having a further higher refractive index are desired, and resins more excellent than cyclic olefin resins are needed.

As a resin containing a sulfur atom, for example, Patent Reference 1 describes a polymer prepared through metathesis polymerization of an aliphatic cyclic olefin that contains a sulfur atom as the constitutive atom of the ring skeleton thereof. Using the polymer realizes a relatively high refractive index of from 1.58 to 1.59, but could not attain a high Abbe's number of at least 50. In addition, the patent reference describes nothing relating to introduction of a sulfonyl group as the constitutive group of the ring skeleton.

On the other hand, Patent Reference 2 says that use of a (meth)acrylate having a sulfonyl group-containing heterocyclic skeleton as a resin material provides a lens having a high refractive index and a high Abbe's number. The polymer has a refractive index of from 1.51 to 1.52 and an Abbe's number of from 60 to 61; however, its practical use is problematic since its water absorption is high.

For these reasons, heretofore, even when a sulfur atom-containing resin is used, all the requirements of high refractivity, high Abbe's number and low water absorption could not be satisfied.

On the other hand, some polymers similar to the polymer of the invention in point of the structure thereof have been proposed.

For example, Patent Reference 3 describes a polymer prepared through copolymerization of an aliphatic polycyclic olefin optionally substituted with a functional group and a polar vinyl olefin. The patent reference describes various types of functional groups as the substituent, showing a sulfonylalkyl group among them. However, the patent reference describes nothing relating to production examples and physical data of sulfonylalkyl group-having polymers, and describes nothing relating to the applicability of the polymers to lenses. In addition, in this, since the sulfonyl group is not a constitutive group of the ring structure of the polymer, the polymer therein differs from the polymer of the invention in point of the structure thereof.

Patent References 4 and 5 describe resins prepared through polymerization of a polycyclic olefin. They say that use of the resin can realize high refractivity, high Abbe's number and high-level heat resistance. However, these references do not describe an aliphatic ring-containing polymer that contains a sulfonyl group as the constitutive group of the ring skeleton thereof. In addition, in Patent Reference 4, use of inorganic fine particles as mixed in the resin is needed, and in Patent Reference 5, use of a fluorine atom-substituted polycyclic polymer is needed; or in other words, the resins in these patent references are limited in point of the usage pattern thereof. Further, from the viewpoint of providing a resin material capable of satisfying all the requirements of high refractivity, high Abbe's number, high-level heat resistance, high-level light transmittance and low water absorption, there is room for further development Patent Reference 1: JP-A 2007-9178
Patent Reference 2: WO2006/075646
Patent Reference 3: JP-T 2008-519882
Patent Reference 4: JP-A 2010-77280
Patent Reference 5: JP-A 2010-145959
Non-Patent Reference 1: Quarterly Journal of Chemical Review, No. 39, Refractivity Control of Transparent Polymer, edited by the Chemical Society of Japan
Non-Patent Reference 2: Technology and Application of Plastic Lenses, published by CMC (2003)

SUMMARY OF THE INVENTION

As in the above, the resin materials heretofore provided in the art are problematic in that they could not satisfy any of the requirements of high refractivity, high Abbe's number, high-level heat resistance, high-level light transmittance and low water absorption, and therefore, development of a more practicable novel material is needed. In consideration of the prior-art problems as above, the present inventors have further investigated for the purpose of providing a novel resin material capable of satisfying all the requirements of high refractivity, high Abbe's number, high-level heat resistance, high-level light transmittance and low water absorption.

The inventors have assiduously studied for the purpose of solving the above-mentioned problems and, as a result, have found that, when a recurring unit that contains an aliphatic ring containing a sulfonyl group as the ring skeleton constitutive group and has a characteristic structure is employed, then an excellent polymer can be provided. In prior arts, the polymer having such a characteristic recurring unit is not proposed at all, and nothing is suggested therein indicating that the polymer can satisfy all the requirements of high refractivity, high Abbe's number, high-level heat resistance, high-level light transmittance and low water absorption. The present invention has been made on the basis of these findings, and includes the following aspects.

[1] A polymer containing a recurring unit having an aliphatic polycyclic structure, wherein at least two atoms constituting the ring skeleton of the aliphatic polycyclic structure constitute the main chain of the polymer, and the recurring unit has an aliphatic ring containing a sulfonyl group as the constitutive group of the ring skeleton.

[2] The polymer of [1], wherein the aliphatic ring containing a sulfonyl group as the constitutive group of the ring skeleton is a ring that constitutes a part of the aliphatic polycyclic structure.

[3] The polymer of [1], wherein the aliphatic ring containing a sulfonyl group as the constitutive group of the ring skeleton bonds to the aliphatic polycyclic structure via a linking group therebetween.

[4] The polymer of any one of [1] to [3], wherein the main chain of the polymer contains an ethylene group, a vinylene group or a vinyleneoxy group, in addition to the atom constituting the aliphatic polycyclic structure.

[5] The polymer of any one of [1] to [4], which also contains a recurring unit having an aliphatic ring structure.

[6] The polymer of any one of [1] to [5], wherein the recurring unit having an aliphatic ring structure contains a fluorine atom, an oxygen atom or a sulfur atom.

[7] The polymer of any one of [1] to [6], wherein the recurring unit having an aliphatic polycyclic structure is represented by the formula (1) mentioned below.

[8] The polymer of [7], wherein the recurring unit having an aliphatic polycyclic structure is represented by the formula (2) or the formula (3) mentioned below.

[9] The polymer of [8], wherein n in the formula (2) and n in the formula (3) are both 0 (zero).

[10] The polymer of any one of [1] to [6], wherein the recurring unit having an aliphatic polycyclic structure is represented by the formula (11) mentioned below.

[11] The polymer of [10], wherein the recurring unit having an aliphatic polycyclic structure is represented by the formula (12) or the formula (13) mentioned below.

[12] The polymer of [11], wherein n in the formula (12) and n in the formula (13) are both 0 (zero).

[13] The polymer of any one of [7] to [12], further containing a recurring unit represented by the formula (21) or the formula (22) mentioned below, in addition to the recurring unit represented by the formula (1) or the formula (2).

[14] The polymer of [13], wherein n in the formula (21) and the formula (22) is 0 (zero), and at least one of $R^{21}$ to $R^{24}$, $R^{29}$ and $R^{30}$ is a flourine atom or a fluoroalkyl group, or at least two of $R^{21}$ to $R^{24}$ bonds to each other to form a ring containing a fluorine atom, an oxygen atom or a sulfur atom.

[15] The polymer of any one of [7] to [14], further containing a recurring unit represented by the formula (23) or the formula (24) mentioned below, in addition to the recurring unit represented by the formula (1) or the formula (2).

[16] The polymer of any one of [7] to [15], further containing a recurring unit represented by the formula (25) mentioned below, in addition to the recurring unit represented by the formula (1) or the formula (2).

[17] The polymer of any one of [13] to [16], wherein the recurring unit represented by the above-mentioned formulae (21) to (25) contains a fluorine atom, a thioether group or an ether group.

[18] The polymer of any one of [10] to [17], further containing a recurring unit represented by the formula (26) mentioned below, in addition to the recurring unit represented by the formula (1) or the formula (2).

[19] A method for producing a polymer comprising polymerizing a polymerizing monomer represented by the formula (31) mentioned below.

[20] The method for producing a polymer of [19], wherein the polymerizing monomer represented by the formula (31) is polymerized in a mode of coordination polymerization.

[21] The method for producing a polymer of [19], wherein the polymerizing monomer represented by the formula (31) is polymerized in a mode of ring-opening metathesis polymerization.

[22] The method for producing a polymer of [21], wherein the ring-opening metathesis polymerization is followed by hydrogenation at the unsaturated bond.

[23] The method for producing a polymer of [21], wherein the ring-opening metathesis polymerization is followed by epoxidation of a part or all of the unsaturated bonds.

[24] The method for producing a polymer of any one of [19] to [23], wherein a polymerizing monomer represented by the formula (41) mentioned below is polymerized along with the polymerizing monomer of the above-mentioned formula (31).

[25] The method for producing a polymer of any one of [19] to [24], wherein a polymerizing monomer represented by the formula (42) mentioned below is polymerized along with the polymerizing monomer of the above-mentioned formula (31).

[26] The method for producing a polymer of any one of [19] to [25], wherein a polymerizing monomer represented by the formula (43) mentioned below is polymerized along with the polymerizing monomer of the above-mentioned formula (31).

[27] The method for producing a polymer of any one of [19] to [26], wherein a polymerizing monomer represented by the formula (44) mentioned below is polymerized along with the polymerizing monomer of the above-mentioned formula (31).

[28] A polymer produced by the method of any one of [19] to [27].

[29] The polymer of any one of [1] to [18] or [28], having a number-average molecular weight of from 1000 to 500000.

[30] A resin composition for optical material, comprising the polymer of any one of [1] to [18], [28] or [29].

[31] A shaped article, comprising the polymer of any one of [1] to [18], [28] or [29].

[32] An optical material, comprising the polymer of any one of [1] to [18], [28] or [29].

[33] A lens, comprising the polymer of any one of [1] to [18], [28] or [29].

The polymer of the invention satisfies high refractivity, high Abbe's number, high-level heat resistance, high-level light transmittance and low water absorption. Therefore, when the polymer of the invention is used, it is possible to provide shaped articles, optical materials, lenses and others satisfying these properties. According to the production method of the invention, the polymer of the invention can be produced with ease.

BEST MODE FOR CARRYING OUT THE INVENTION

The polymer, the resin material for optical material, the shaped article, the optical material and the lens of the invention are described in detail hereinunder. The description of the constitutive elements of the invention given hereinunder is for some typical embodiments and specific examples of the invention, to which, however, the invention should not be limited. In this description, the numerical range expressed by the wording "a number to another number" means the range that falls between the former number indicating the lowermost limit of the range and the latter number indicating the uppermost limit thereof.

[Polymer]

The polymer of the invention is a polymer containing a recurring unit having an aliphatic polycyclic structure, wherein at least two atoms constituting the ring skeleton of the aliphatic polycyclic structure constitute the main chain of the polymer, and the recurring unit has an aliphatic ring containing a sulfonyl group as the constitutive group of the ring skeleton.

"Aliphatic polycyclic structure" as referred to herein means a structure where at least two non-aromatic rings are fused. For example, the structure includes a bicyclic structure, a tricyclic structure, a tetracyclic structure, a pentacyclic structure, a hexacyclic structure, etc.; and preferred are a bicyclic structure, a tricyclic structure and a tetracyclic structure, and more preferred are a bicyclic structure and a tricyclic structure. The individual aliphatic rings constituting the aliphatic polycyclic structure generally each have a ring skeleton composed of from 3 to 12 atoms, and the number of the constitutive atoms of the ring skeleton is preferably from 4 to 10 atoms, more preferably from 5 to 8 atoms, even more preferably from 5 to 7 atoms, still more preferably 5 or 6 atoms. The total number of the atoms constituting the ring skeleton may be generally from 6 to 20 atoms, preferably from 6 to 15 atoms, more preferably from 6 to 13 atoms, even more preferably from 7 to 12 atoms. The atoms constituting the ring skeleton include, for example, a carbon atom, a sulfur atom, an oxygen atom and a nitrogen atom; and preferred are a carbon atom, a sulfur atom and an oxygen atom, and more preferred are a carbon atom and a sulfur atom. Preferably, at least one atom constituting the ring skeleton is a sulfur atom constituting a sulfonyl group.

Specific examples of the ring skeleton includes, for example, a bicyclo[2.2.1]heptane skeleton, a bicyclo[2.2.2]octane skeleton, a tricyclo[5.2.1.0$^{2,6}$]decane skeleton, a tricyclo[6.2.1.0$^{2,7}$]undecane skeleton, a tricyclo[6.2.2.0$^{2,6}$]undecane skeleton, a tricyclo[7.2.2.0$^{2,7}$]dodecane skeleton, a tetracyclo[7.2.1.0$^{2,7}$.0$^{3,6}$]dodecane skeleton, a tetracyclo[7.2.2.1$^{2,7}$.0$^{3,6}$]dodecane skeleton and a tetracyclo[7.2.2.2$^{3,6}$.0$^{2,7}$]tridecane skeleton, in which the carbon atom constituting the ring skeleton is substituted with a sulfur atom constituting a sulfonyl group.

In the polymer of the invention, at least two atoms constituting the ring skeleton of the aliphatic polycyclic structure constitute the main chain of the polymer. The number of the atoms constituting the main chain of the polymer may be from 2 to 4 atoms, preferably 2 atoms or 3 atoms. Preferably, the atoms constituting the main chain of the polymer are the atoms constituting the end of the aliphatic polycyclic structure. The atoms constituting the main chain in the recurring unit may include any other atom than the above-mentioned, at least two atoms constituting the ring skeleton of the aliphatic polycyclic structure. For example, there may be mentioned an alkylene group, a vinylene group and a vinyleneoxy group; and preferred are an ethylene group, a vinylene group and a vinyleneoxy group, and more preferred is an ethylene group.

In the polymer of the invention, the recurring unit having an aliphatic polycyclic structure has an aliphatic ring that contains a sulfonyl group as the constitutive group of the ring skeleton. In this, the sulfonyl group may be contained as the constitutive group of the ring skeleton of the aliphatic polycyclic structure, or may be contained as the constitutive group of the ring skeleton of the aliphatic ring that constitutes a part or all of the substituent bonding to the aliphatic polycyclic structure. In one preferred embodiment of the invention, a sulfonyl group is contained as the constitutive group of the ring skeleton of the aliphatic polycyclic structure.

In case where the sulfonyl group is contained as the constitutive group of the ring structure of the aliphatic polycyclic structure, the position of the sulfonyl group in the ring skeleton is not specifically defined. Accordingly, the sulfonyl group may be contained in the ring that contains the atoms constituting the main chain of the polymer (ring of which the number of the ring-constituting atoms is the smallest), or the sulfonyl group may be contained in any other ring than the ring that contains the atoms constituting the main chain of the polymer (ring of which the number of the ring-constituting atoms is the smallest). Preferred is the case where the sulfonyl group is contained in any other ring than the ring that contains the atoms constituting the main chain of the polymer (ring of which the number of the ring-constituting atoms is the smallest), for which, for example, there may be mentioned an embodiment where the sulfonyl group is contained as a group constituting the rink skeleton remotest from the ring that contains the atoms constituting the main chain of the polymer (ring of which the number of the ring-constituting atoms is the smallest). Preferably, the number of the sulfonyl groups to be contained in the aliphatic ring skeleton is from 1 to 3, more preferably from 1 or 2, even more preferably 1.

Also in the case where the sulfonyl group is contained as the constitutive group of the ring skeleton of the aliphatic ring that constitutes a part or all of the substituent bonding to the aliphatic polycyclic structure, the position of the sulfonyl group is not specifically defined. Also in this case, the ring that contains the sulfonyl group as the skeleton-constituting group may bond to the aliphatic polycyclic structure via a single bond therebetween or may be bonded thereto via a linking group such as an alkylene group, an arylene group or the like therebetween. The ring containing the sulfonyl group as the skeleton-constituting group and the aliphatic polycyclic structure may form a spiro structure. The ring containing the sulfonyl group as the skeleton-constituting group may have a single-ring structure or a multi-ring structure. Specific examples of the ring that contains the sulfonyl group as the skeleton-constituting group include tetrahydrothiophene, 1,1-dioxide ring, 7-thiabicyclo[2.2.1]heptane 7,7-dioxide ring, etc.

The ring structure to be contained in the recurring unit having the aliphatic polycyclic structure may be substituted with various substituents. For example, the substituents include an alkyl group (preferably having from 1 to 12 carbon atoms, more preferably from 1 to 6 carbon atoms, even more preferably from 1 to 3 carbon atoms, for example, a methyl group, an ethyl group, a propyl group, etc.), an alkoxy group (preferably having from 1 to 12; more preferably from 1 to 6, even more preferably from 1 to 3 carbon atoms, for example, a methoxy group, an ethoxy group, a propoxy group, etc.), an alkylthio group (preferably having from 1 to 12, more preferably from 1 to 6, even more preferably from 1 to 3 carbon atoms, for example, a methylthio group, an ethylthio group, etc.), a halogen atom (for example, a fluorine atom, a chlorine atom, a bromine atom, an iodine atom), a heterocyclic group (preferably having from 1 to 30, more preferably from 1 to 12 carbon atoms, and having, for example, a nitrogen atom, an oxygen atom or a sulfur atom as the hetero atom; for example, an imidazolyl group, a pyridyl group, a quinolyl group, a furyl group, a piperidyl group, a morpholino group, a benzoxazolyl group, a benzimidazolyl group, a benzothiazolyl group, etc.). These substituents may be further substituted. In case where the structure has two or more substituents, they may be the same or different. If possible, the substituents may bond to each other to form a ring. In the invention, preferred is an embodiment where the structure is substituted with an alkyl group or a halogen atom, more preferably with a halogenoalkyl group or a halogen atom, even more preferably with a perfluoroalkyl group or a fluorine atom.

Structural examples of the recurring unit having the aliphatic polycyclic structure that constitutes the polymer of the invention include recurring units represented by the following formula (1):

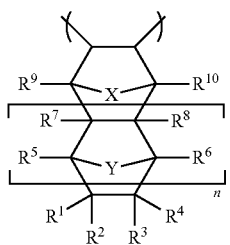

(1)

In the formula (1), $R^1$ to $R^{10}$ each independently represent a hydrogen atom or a substituent. At least two of $R^1$ to $R^{10}$ may bond to each other to form a ring. Examples of the substituent include the above-mentioned alkyl group, alkoxy group, alkylthio group, halogen atom and heterocyclic group. These substituents may be further substituted. In case where the structure has two or more substituents, they may be the same or different. $R^1$ to $R^{10}$ satisfy at least one of the following (condition 1) to (condition 3).

(Condition 1) At least one of $R^1$ to $R^4$ is a substituent having an aliphatic ring that contains a sulfonyl group as the ring skeleton-constituting group.

(Condition 2) $R^1$ and $R^2$, or $R^3$ and $R^4$ bond to each other to form an aliphatic ring that contains a sulfonyl group as the ring skeleton-constituting group.

(Condition 3) Any of $R^1$ and $R^2$, and any of $R^3$ and $R^4$ bond to each other to form an aliphatic ring that contains a sulfonyl group as the ring skeleton-constituting group.

The aliphatic ring that contains a sulfonyl group as the ring skeleton-constituting group is as described above. X and Y each independently represent any of a methylene group (—CH$_2$—), a thioether group (—S—), an ether group (—O—) or a sulfonyl group (—SO$_2$—). n indicates an integer of from 0 to 2. When n is 2, two Y's, two $R^5$'s, two $R^6$'s, two $R^7$'s and two $R^8$'s each may be the same or different. n is preferably 0 or 1, more preferably 0.

Of the recurring unit represented by the formula (1), preferred are those where $R^2$ and $R^3$ bond to each other to form a structure containing a sulfonyl group as the ring skeleton-constituting group. Of the structure of the type, more preferred is a recurring unit having a structure represented by the following formula (2) or (3):

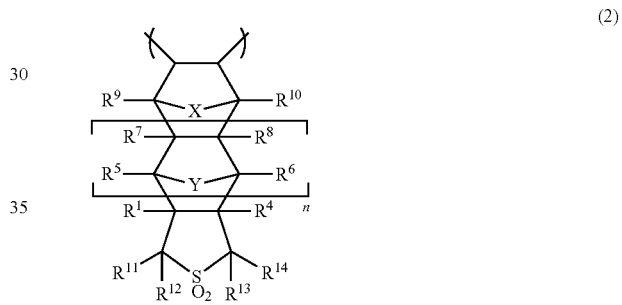

(2)

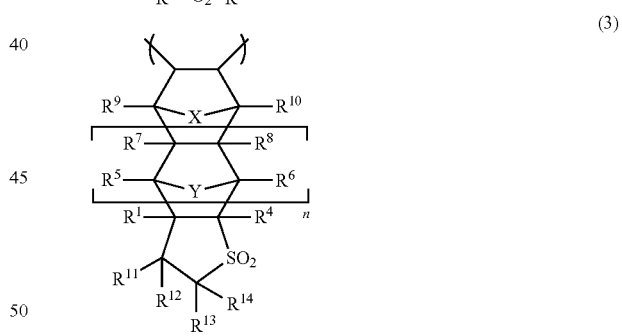

(3)

In the formula (2) and the formula (3), $R^1$ and $R^4$ to $R^{14}$ each independently represent a hydrogen atom or a substituent, at least two of $R^1$ and $R^4$ to $R^{14}$ may bond to each other to form a ring. Examples of the substituent include the above-mentioned alkyl group, alkoxy group, alkylthio group, halogen atom and heterocyclic group. X and Y each independently represent any of a methylene group (—CH$_2$—), a thioether group (—S—), an ether group (—O—) or a sulfonyl group (—SO$_2$—). n indicates an integer of from 0 to 2. When n is 2, two Y's, two $R^5$'s, two $R^6$'s, two $R^7$'s and two $R^8$'s each may be the same or different. n is preferably 0 or 1, more preferably 0.

As the recurring unit having a structure different from that of the formulae (1) to (3), also preferred is a recurring unit having a structure represented by the following formula (11):

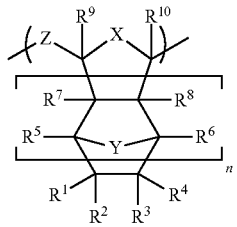
(11)

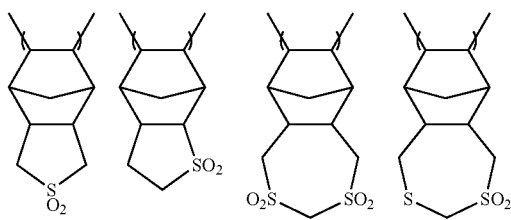

In the formula (11), the preferred range of the definition of $R^1$ to $R^{10}$, X and Y is the same as that in the formula (1). In the formula (11), Z represents an ethylene group (—CH$_2$CH$_2$—), a vinylene group (—CH=CH—) or a vinyleneoxy group

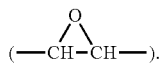

The compound where Z is a vinylene group is useful as the starting material for the compound where Z is an ethylene group or the compound where Z is a vinyleneoxy group.

Of the recurring unit represented by the formula (11), preferred are those where $R^2$ and $R^3$ bond to form a structure containing a sulfonyl group as the ring skeleton-constituting group. Of the structure of the type, more preferred are a recurring unit having a structure represented by the following formula (12) or formula (13):

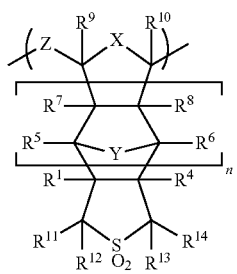
(12)

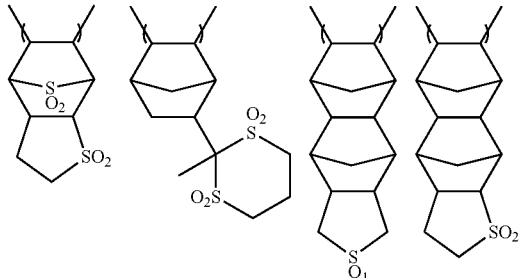

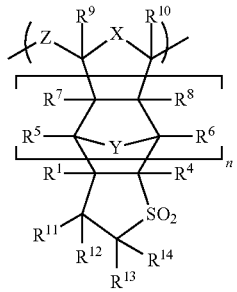
(13)

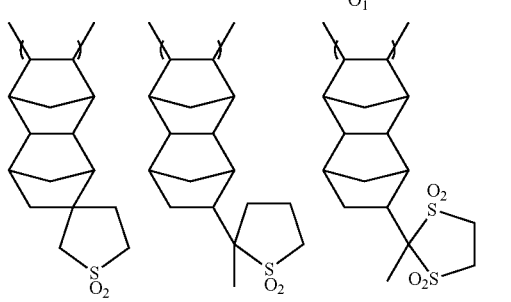

In the formula (12) and the formula (13), the preferred range of the definition of $R^1$, $R^4$ to $^{10}$, X, Y and Z is the same as that in the formula (11). $R^{11}$ to $R^{14}$ each independently represent a hydrogen atom or a substituent, and the preferred range thereof is the same as that of $R^4$ to $R^{10}$.

Specific examples of the recurring unit represented by any of the formulae (1) to (3) and the formulae (11) to (13) are shown below. However, the range of the recurring unit employable in the invention is not limitatively interpreted by these exemplifications.

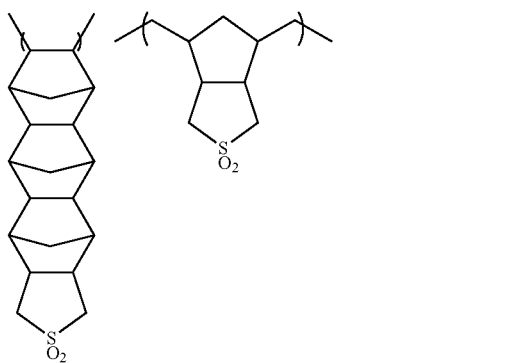

-continued
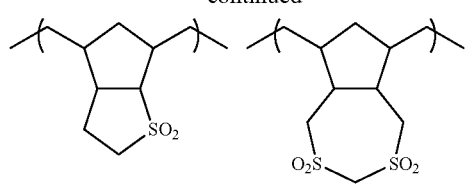
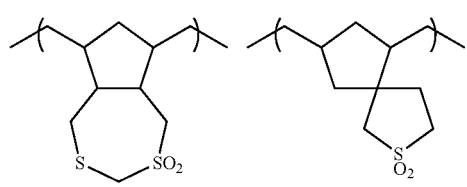
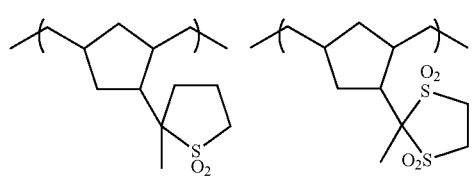
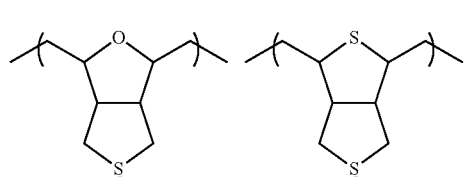
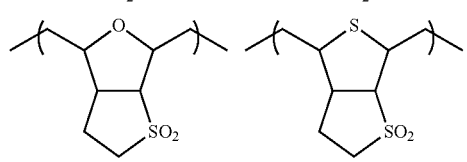
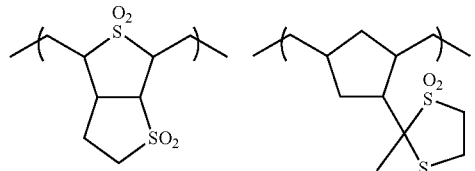
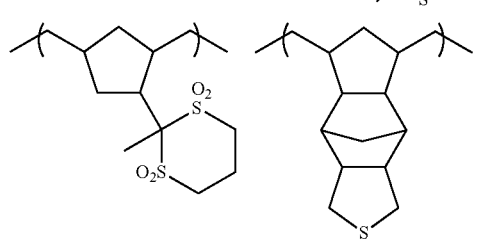
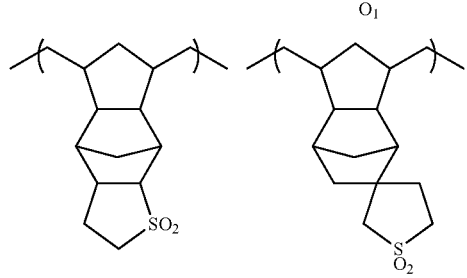
-continued
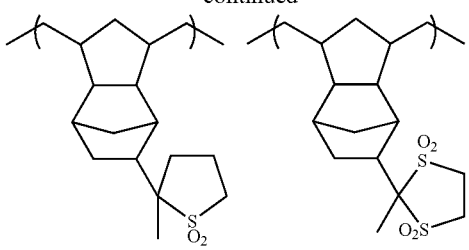
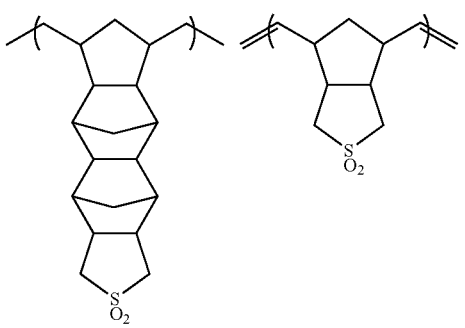
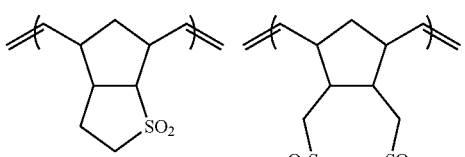
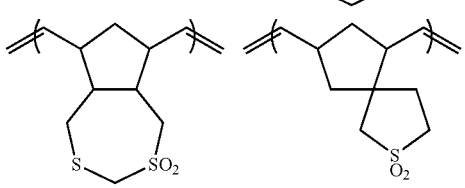
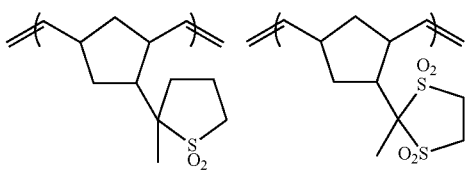
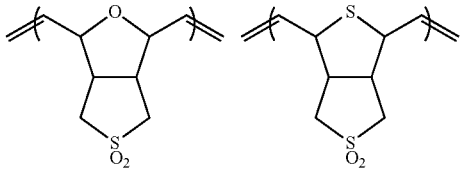
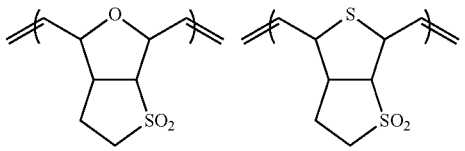
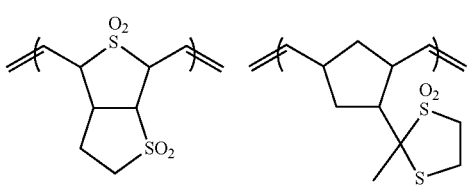

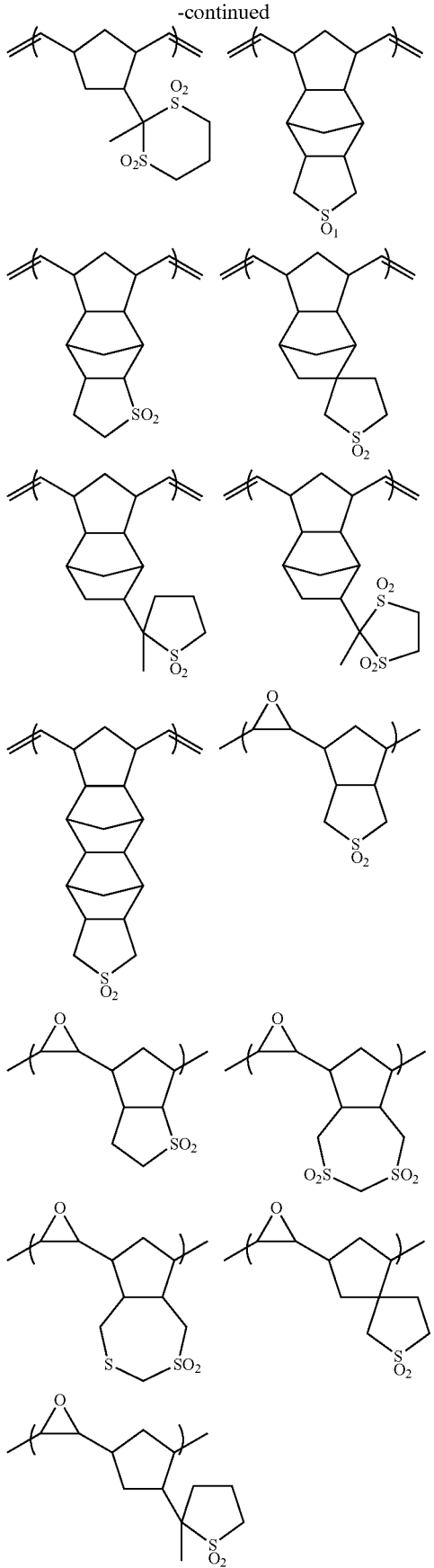

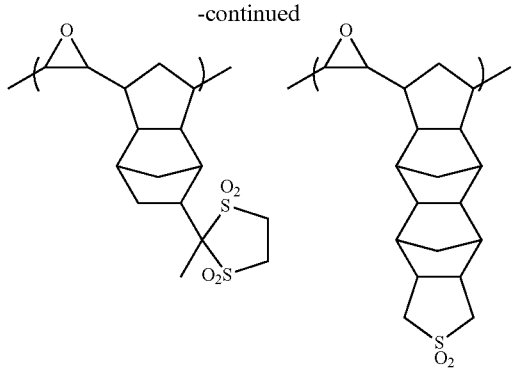

The polymer of the invention may contain only one type or two or more types of the recurring units satisfying the above-mentioned condition. The polymer of the invention may further contain any other recurring unit not satisfying the above-mentioned condition. The proportion of the recurring unit satisfying the condition in the polymer of the invention may be generally from 10 to 100% by weight, preferably from 20 to 100% by weight, more preferably from 30 to 100% by weight.

As the recurring unit not satisfying the condition, various recurring units may be selected. Above all, preferably employed is a recurring unit having a cyclic structure, or a recurring unit containing a halogen atom or a halogenoalkyl group. For example, a recurring unit represented by the following formula (21) or formula (22) may be mentioned.

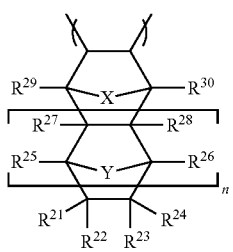

(21)

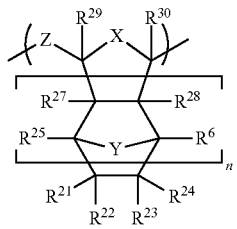

(22)

In the formulae (21) and (22), $R^{21}$ to $R^{30}$ each independently represent a hydrogen atom or a substituent; and at least two of $R^{21}$ to $R^{30}$ may bond to each other to form a ring. As the substituent, there may be mentioned the above-mentioned alkyl group, alkoxy group, alkylthio group, halogen atom and heterocyclic group. These substituents may be further substituted. In case where the structure has two or more substituents, they may be the same or different. The definition and the preferred range of X, Y, Z and n are the same as in the formula (11).

Of the recurring unit represented by the formula (21) and the formula (22), preferred are those where n is 0, and at least one of $R^{21}$ to $R^{24}$, $R^{29}$ and $R^{30}$ is a fluorine atom or a fluoroalkyl group, or at least two of $R^{21}$ to $R^{24}$ bond to each other to form a ring containing a fluorine atom, an oxygen atom or a sulfur atom.

As other recurring units, also preferred are those having a structure represented by the following formula (23) or formula (24):

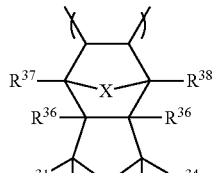

(23)

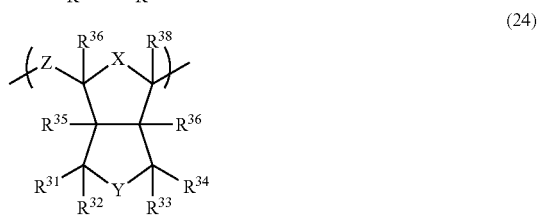

(24)

In the formula (23) and the formula (24), $R^{31}$ to $R^{38}$ each independently represent a hydrogen atom or a substituent, and at least two of $R^{31}$ to $R^{38}$ may bond to each other to form a ring. Examples and the preferred range of the substituent are the same as in the formula (21). The definition and the preferred range of X, Y, Z and n are the same as in the formula (11).

As still other recurring units, also preferred are those having a structure represented by the following formula (25) or formula (26):

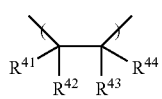

(25)

In the formula (25), $R^{41}$ to $R^{44}$ each independently represent a hydrogen atom, a halogen atom, an alkyl group or a halogenoalkyl group; and any of $R^{41}$ or $R^{42}$, and any of $R^{43}$ or $R^{44}$ may bond to each other to form a ring.

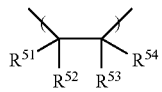

(26)

In the formula (26), $R^{51}$ to $R^{54}$ each independently represent a hydrogen atom, a halogen atom, an alkyl group or a halogenoalkyl group, and $R^{51}$ and $R^{52}$ may bond to each other to form a ring; however, at least one of $R^{51}$ to $R^{54}$ contains a fluorine atom.

Specific examples of the recurring unit represented by any of the formulae (21) to (26) are shown below. However, the range of the recurring unit employable in the invention should not be limitatively interpreted by these exemplifications.

17
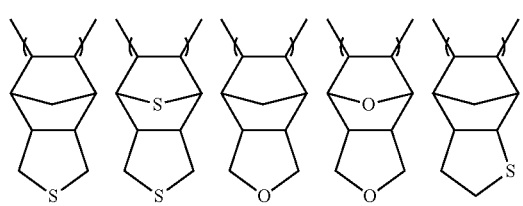
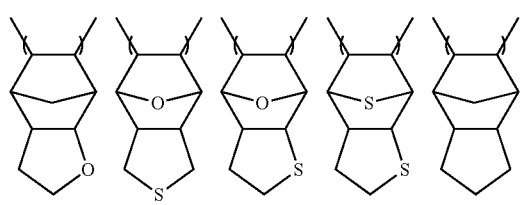
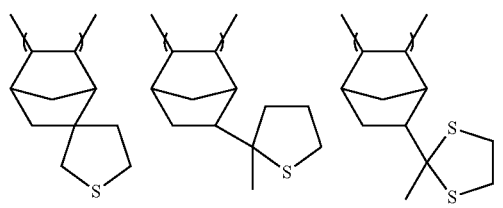
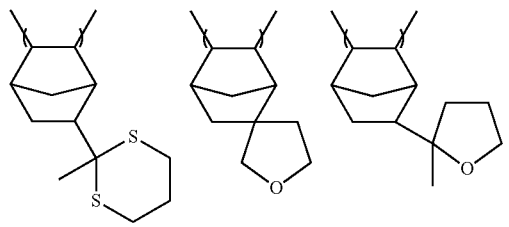
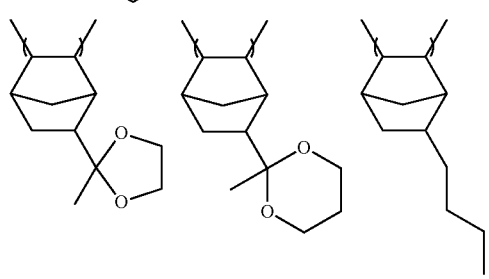
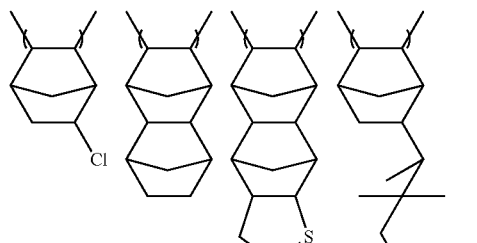
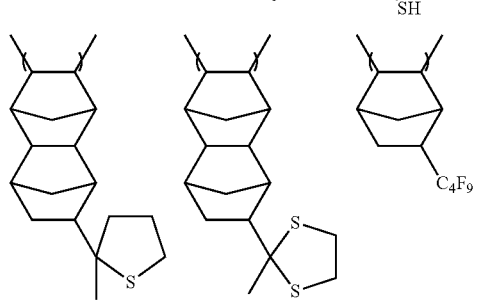
18
-continued
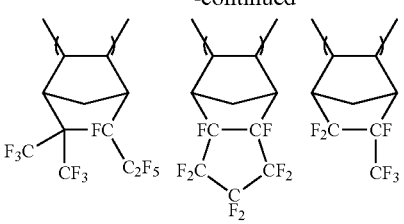
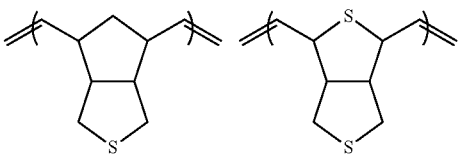
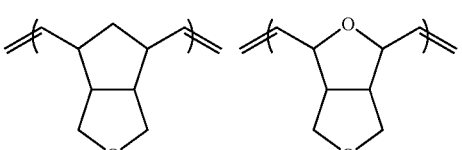
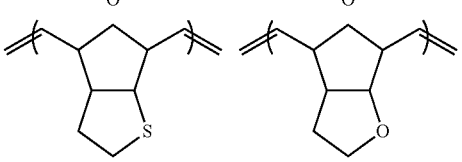
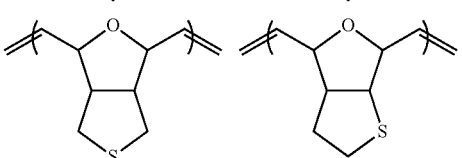
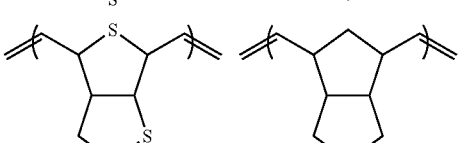
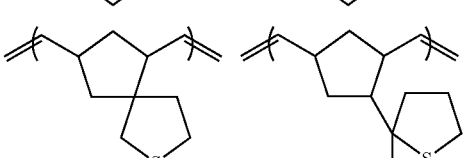
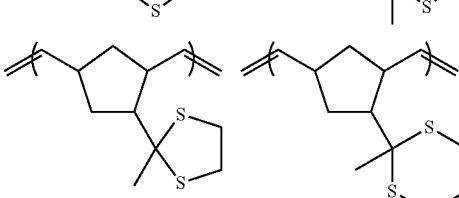
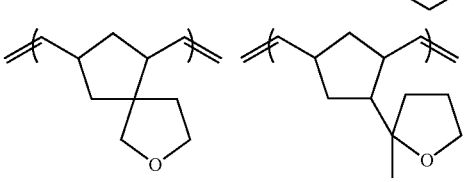
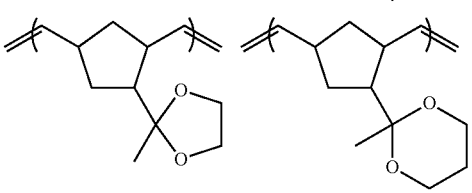

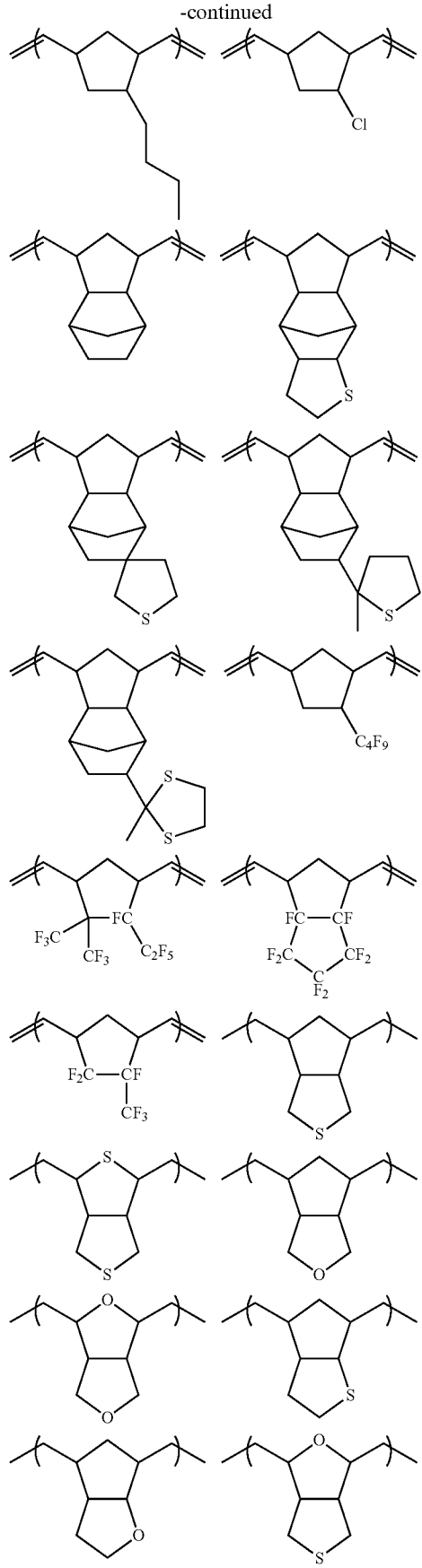
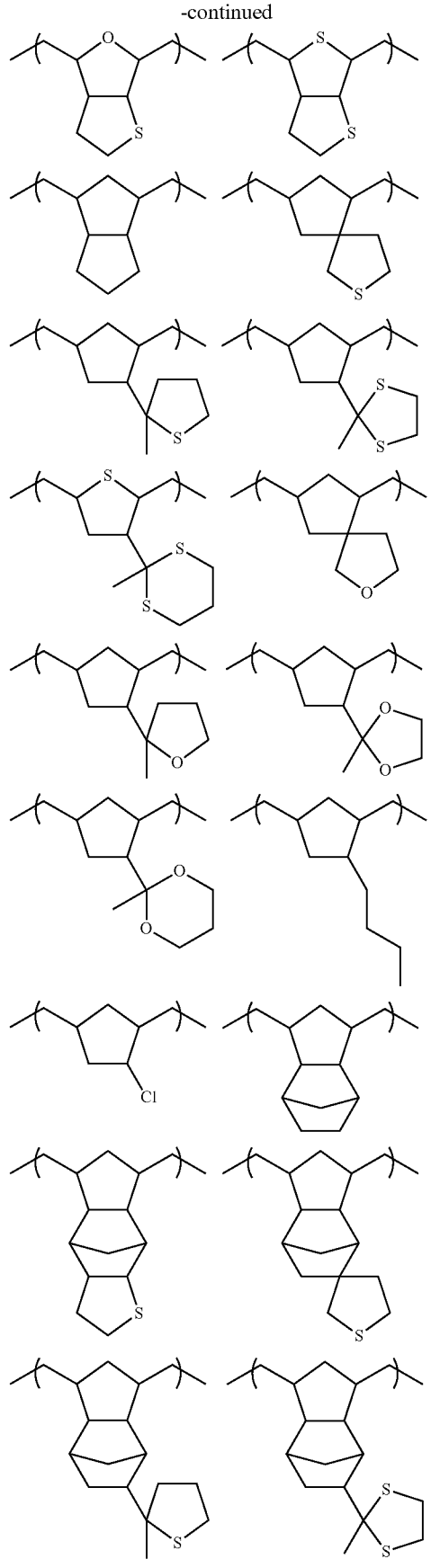

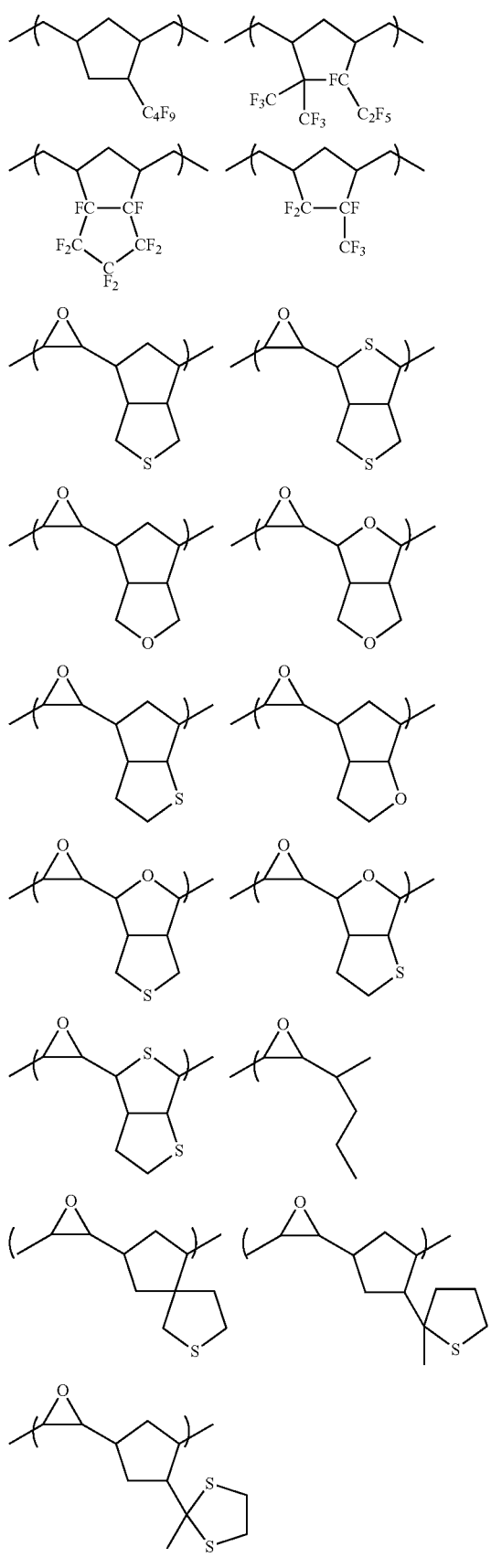
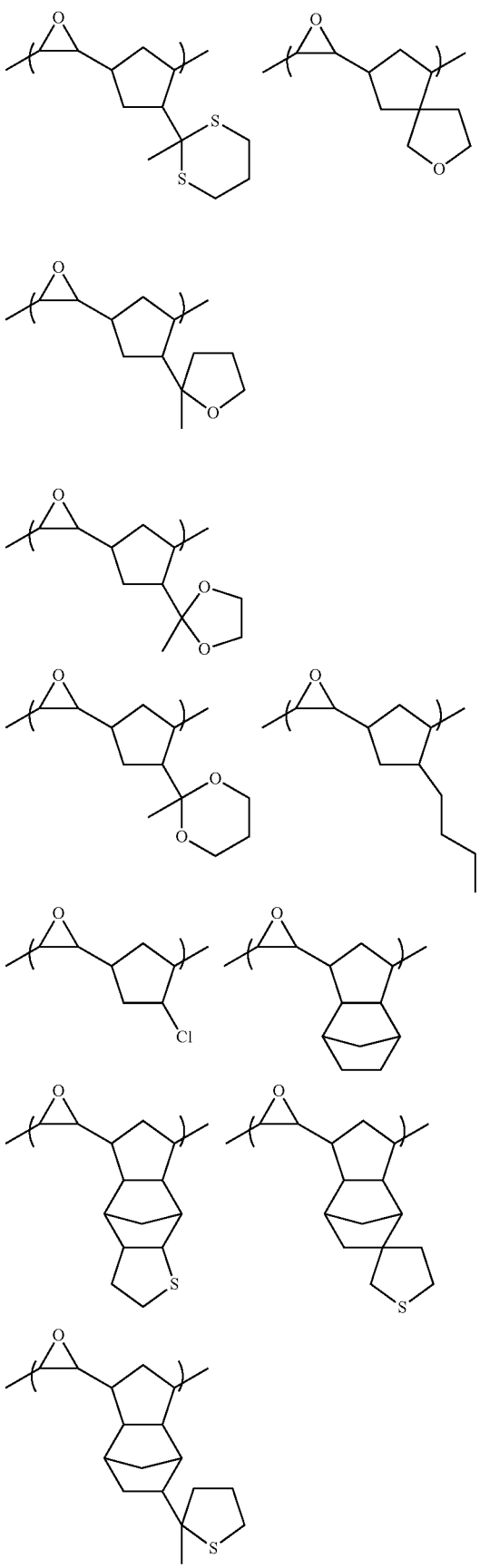

-continued

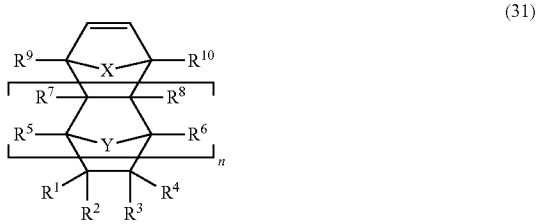

[Polymer Production Method]

The polymer of the invention can be produced by polymerizing a polymerizing monomer that corresponds to the recurring unit constituting the polymer of the invention. For example, according to the production method of the invention of polymerizing a polymerizing monomer represented by the following formula (31), the polymer of the invention can be produced in a simplified manner.

(31)

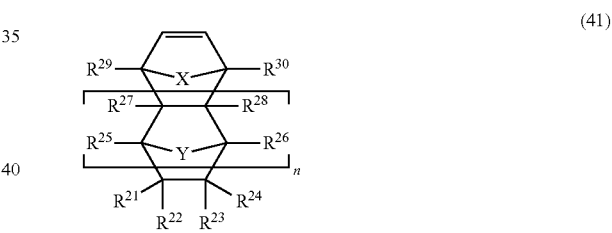

In the formula (31), the definition and the preferred range of $R^1$ to $R^{10}$, X, Y and n are the same as in the formula (1). The polymerizing monomer of the formula (31) that contains a sulfonyl group as the ring skeleton-constituting group may be suitably produced by combining known production methods. For example, there may be mentioned a method comprising reacting a compound that contains a thioether group as the ring skeleton-constituting group thereof with potassium peroxodisulfate to thereby oxidize the thioether group into a sulfonyl group (see J. Org. Chem. 1985, 50, 1544-1545).

The method of polymerizing the polymerizing monomer represented by the formula (31) includes coordination polymerization and ring-opening metathesis polymerization. According to coordination polymerization, the polymer having a recurring unit represented by the formula (1) can be produced; and according to ring-opening metathesis polymerization, the polymer having a recurring unit of the formula (11) wherein Z is a vinylene group can be produced. When ring-opening metathesis polymerization is followed by hydrogenation at the unsaturated bond, the polymer having a recurring unit of the formula (11) wherein Z is an ethylene group can be produced. When ring-opening metathesis polymerization is followed by epoxidation of a part or all of the unsaturated bonds, the polymer having a recurring unit of the formula (11) wherein Z is a vinyleneoxy group can be produced.

These reactions are well known by anyone skilled in the art, and the reaction conditions generally employed in the art may be suitably combined and employed in the invention.

According to the production method of the invention, the polymerizing monomer represented by the formula (31) may be copolymerized with various polymerizing monomers. As preferred examples of such copolymerizable monomers, those represented by the following formulae (41) to (44) may be mentioned here.

(41)

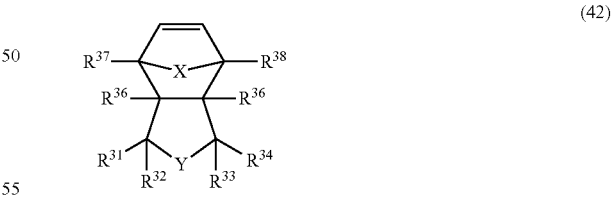

In the formula (41), the definition and the preferred range of $R^{21}$ to $R^{30}$, X, Y and n are the same as in the formula (21).

(42)

In the formula (42), the definition and the preferred range of $R^{31}$ to $R^{38}$, X and Y are the same as in the formula (23).

(43)

$$R^{41}\diagdown_{C=C}\diagup R^{44}$$
$$R^{42}\diagup \quad \diagdown R^{43}$$

In the formula (43), the definition and the preferred range of $R^{41}$ to $R^{44}$ are the same as in the formula (25).

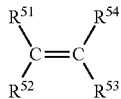

(44)

In the formula (44), the definition and the preferred range of $R^{51}$ to $R^{54}$ are the same as in the formula (26).

[Resin Composition for Optical Material]

The resin composition for optical material of the invention is a composition containing the above-mentioned polymer of the invention. Specifically, the resin composition for optical material of the invention is characterized by containing a polymer which contains a recurring unit having an aliphatic polycyclic structure and in which at least two atoms constituting the ring skeleton of the aliphatic polycyclic structure constitute the main chain of the polymer and the recurring unit has an aliphatic ring containing a sulfonyl group as the constitutive group of the ring skeleton. The resin composition for optical material of the invention may contain only one type or two or more different types of the polymers of the invention, either singly or as combined.

Not contradictory to the scope and the sprit of the invention, the resin composition for optical material of the invention may contain additives such as resin not satisfying the condition defined in the invention, dispersant, plasticizer, heat stabilizer, lubricant, etc.

The proportion of the polymer to be contained in the resin composition for optical material of the invention is preferably from 40 to 100% by weight, more preferably from 60 to 100% by weight, even more preferably from 80 to 100% by weight.

Preferably, the shaped article of the invention has a glass transition temperature of not lower than 70° C., more preferably from 80 to 300° C., even more preferably from 100 to 270° C. In particular, the shaped article that comprises the polymer having the recurring unit of the formula (1) has a high glass transition temperature of generally not lower than 180° C., preferably from 200 to 300° C., more preferably from 215 to 270° C.

Preferably, the light transmittance at a wavelength of 589 nm of the resin composition for optical material of the invention through a thickness thereof of 1 mm is at least 50%, from the viewpoint of using the composition for optical parts. The light transmittance through a thickness of 1 mm is more preferably at least 60%, even more preferably at least 70%, still more preferably at least 80%. When the light transmittance at a wavelength of 589 nm through a thickness of 1 mm is at least 50%, the composition can more easily form a lens substrate having more preferred properties. The light transmittance of the resin composition for optical material of the invention through a thickness thereof of 1 mm is a value measured by shaping the resin composition into a plate having a thickness of 1.0 mm, and analyzing it with a UV-visible light absorption spectrometer (Shimadzu's UV-3100).

Preferably, the refractive index nD of the resin composition for optical material of the invention is at least 1.47, more preferably at least 1.50, even more preferably at least 1.53. Preferably, the Abbe's number νD of the resin composition for optical material of the invention is at least 50, from the viewpoint of reducing the chromatic aberration thereof in use for lenses, more preferably at least 53, even more preferably at least 55. In this description, the Abbe's number νD may be computed according to the following formula (A), in which nD, nF and nC each mean the refractive index of the resin composition measured at a wavelength of 589 nm, 486 nm and 656 nm, respectively.

$$\nu D = (nD-1)/(nF-nC) \quad (A)$$

Preferably, the resin composition for optical material of the invention has a high refractive index nD and a high Abbe's number νD. Preferably, the product of the refractive index nD and the high Abbe's number νD of the resin material (nD× νD) is at least 85, more preferably at least 87, even more preferably at least 93, still more preferably at least 100. One typical and preferred embodiment of the resin composition for optical material of the invention has a refractive index nD of at least 1.47, an Abbe's number νD of at least 50, a product of the two (nD×νD) of at least 85, and a glass transition temperature of not lower than 180° C.

The water absorption of the resin composition for optical material of the invention may be low as containing the polymer of the invention. The water absorption as referred to in the invention is determined by conditioning a powdery sample of the resin composition in a constant temperature and humidity room followed by analyzing it according to a Karl-Fischer moisture titration method. Preferably, the water absorption of the resin composition for optical material of the invention is at most 1.6, more preferably at most 1.0, even more preferably at most 0.5.

[Shaped Article]

Shaping the resin composition for optical material of the invention gives the shaped article of the invention. The resin composition for optical material of the invention may be cast-molded using a solvent to give a shaped article thereof, but is preferably shaped in a solid state not using a solvent, for example, according to a method of injection molding, compression molding or the like.

Preferably, the maximum thickness of the shaped article of the invention is at least 0.1 mm. The maximum thickness is more preferably from 0.1 to 5 mm, even more preferably from 1 to 3 mm. The shaped article of which the thickness falls within the range is especially useful as an optical part having a high refractive index. In general, it is not easy to produce such a thick shaped article according to a solution-casting method since the solvent is hardly removed in the method. However, the resin composition for optical material of the invention can be readily shaped in any method and can readily realize any complicated configuration having a non-spherical surface or the like. According to the invention, therefore, a shaped article having high refractivity and high transparency can be obtained.

[Optical Part]

The shaped article of the invention satisfies all requirements of high refractivity, high Abbe's number, high-level heat resistance, high-level light transmittance, low water absorption and lightweightness and is therefore excellent in such optical characteristics. The optical part of the invention comprises the shaped article. The type of the optical part of the invention is not specifically defined. In particular, the invention is favorably applied to optical parts that take advantage of the excellent optical properties of the resin composition for optical material of the invention, especially to light-transmitting optical parts (so-called passive optical parts). Optically functional devices equipped with such optical parts include, for example, various display devices (liquid-crystal displays, plasma displays, etc.), various projector devices (OHPs, liquid-crystal projectors, etc.), optical fiber communication devices (optical waveguides, optical amplifiers, etc.), imaging devices such as cameras, videos, etc.

The above-mentioned passive optical parts for use in optically functional devices include, for example, lenses, prisms, prism sheets, panels (tabular shaped articles), films, optical waveguides (as films, fibers, etc.), optical discs, LED sealants, etc. The passive optical parts may have a multilayer configuration having, as optionally provided thereon, additional functional layers of optional coating layers, for example, a protective layer for protecting the coating surface from mechanical damages by friction or abrasion, a light absorbing layer capable of absorbing a light having an undesirable wavelength that would cause deterioration of inorganic particles and substrate, a transmission-blocking layer capable of blocking or reducing transmission of reactive low-molecular substances such as water, oxygen gas, etc., an antiglare layer, an antireflection layer, a low-refractivity layer, etc. Specific examples of such optional coating layers include a transparent conductive layer of an inorganic oxide coating layer, a gas barrier film of a gas barrier layer or an organic coating layer, and a hard coat layer. For forming the layers by coating, any known coating methods are employable, such as a vacuum evaporation method, a CVD method, a sputtering method, a dipping method, a spin coating method, etc.

[Lens]

The optical part comprising the resin composition for optical material of the invention is favorable especially to lens substrates. The lens substrate formed of the resin composition for optical material of the invention has a high Abbe's number and additionally has high refractivity, good light transmittance and lightweightness and is therefore excellent in optical properties. By suitably selecting the type of the monomers to constitute the resin composition for optical material, the refractive index of the lens substrate can be controlled in any desired manner.

"Lens substrate" in the invention means a single part capable of expressing a lens function. On the surface and at the periphery of the lens substrate, there may be provided a film and a part depending on the service condition and the use of the lens. For example, on the surface of the lens substrate, a protective film, an antireflection film, a hard coat film and the like may be formed. The periphery of the lens substrate may be fitted into a substrate holding frame to fix it. However, these film and frame are parts optionally added to the lens substrate of the invention, and are differentiated from the lens substrate itself of the invention.

In case where the lens substrate of the invention is used as a lens, the lens substrate itself of the invention may be used directly as a lens by itself, or as described above, a film or a frame may be added thereto to constitute a lens. The type and the shape of the lens using the lens substrate of the invention are not specifically defined. The lens substrate of the invention is used, for example, for lenses for spectacles, lenses for optical instruments, lenses for optoelectronics, laser lenses, pickup lenses, in-vehicle camera lenses, mobile camera lenses, digital camera lenses, OHP lenses, lenses constituting microlens arrays, etc.

EXAMPLES

The characteristics of the invention are described more concretely with reference to Production Examples, Examples, Comparative Examples and Test Examples given below. The material used, its amount and ratio, the details of the treatment and the treatment process in the following Examples may be suitably modified or changed not overstepping the sprit and the scope of the invention. Accordingly, the invention should not be limitatively interpreted by the Examples mentioned below.

Production Example 1

Production of 3-methanesulfonyloxybicyclo[2.2.1]hept-5-en-2-ylmethyl methanesulfonate (1)

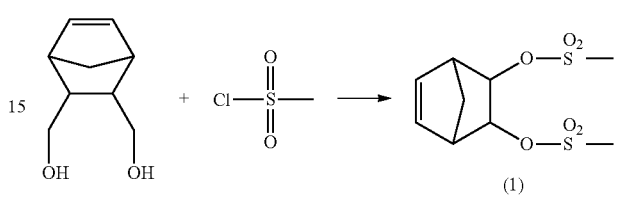

23 mL of dehydrated pyridine was put into a 100-mL three-neck flask equipped with a thermometer, two dropping funnels and a nitrogen introducing duct and provided with a stirrer chip put therein, then purged with nitrogen, and cooled to an inner temperature of 0° C. In a nitrogen flow, one dropping funnel was filled with 8.2 g (71.3 mmol) of methanesulfonyl chloride, and the chloride was put into the flask dropwise and carefully so that the inner temperature of the flask could not be more than 0° C., taking one hour, and thereafter this was stirred at 0° C. for 1 hour. The other dropping funnel was filled with 5.0 g (32.4 mmol) of 5-norbornene-2-exo-3-exo-dimethanol dissolved in 20 mL of dehydrated pyridine, and the dimethanol was dropwise put into the flask with the reaction liquid therein kept at 5° C., taking 5 hours, and thereafter this was stirred at 0° C. for 15 hours. The reaction liquid was reprecipitated in an aqueous 5% hydrochloric acid solution, and the deposited brown solid was collected through suction filtration. The collected solid was washed twice with 800 mL of water, then dried in vacuum at 50° C. for 8 hours, and recrystallized from 250 mL of ethanol to give 8.45 g of a white solid of the compound (I) (yield, 83.7%).

Production Example 2

Production of 4-thiatricyclo[5.2.1.0$^{2,6}$]dec-8-ene (M-2)

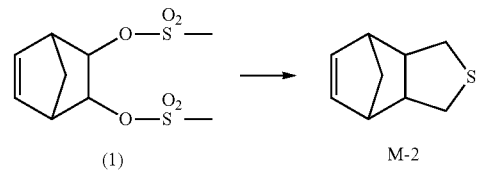

The compound (1) produced in Production Example 1 and anhydrous methanol were put into a 200-mL three-neck flask equipped with a thermometer, a reflux tube and a 100-mL dropping funnel and provided with a stirrer chip put therein, then purged with nitrogen, and thereafter dissolved under reflux. A mixture of 21.2 g (88.4 mmol) of sodium sulfide 9-hydrate and 51 mL of water was dropwise added thereto via the dropping funnel, taking 1 hour. After the addition, this was further refluxed for 2 hours, then the reaction liquid was cooled to room temperature and extracted with ethyl acetate.

The organic layer was washed with 100 mL of an aqueous 10% sodium hydroxide solution, and dried with magnesium sulfate added thereto, then filtered to remove magnesium sulfate, and the filtrate was dried with a rotary evaporator. Using hexane as a developing solvent, this was purified through silica gel column chromatography to give 3.49 g of a colorless transparent liquid of the compound (M-2) (yield, 58.0%).

Production Example 3

Production of 4-thiatricyclo[5.2.1.0$^{2,6}$]dec-8-ene4,4-dioxide (M-1)

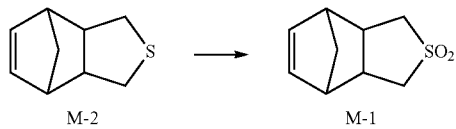

2.3 g (15.1 mmol) of the compound (M-2) produced in Production Example 2 and 60 mL of anhydrous methanol were put into a 200-mL three-neck flask equipped with a thermometer, a nitrogen introducing duct-fitted air-cooled tube and a 100-mL dropping funnel and provided with a stirrer chip put therein, and cooled to 0° C. An aqueous solution prepared by mixing 13.9 g (22.7 mmol) of Oxone (registered trademark, 2KHSO$_5$.KHSO$_4$.K$_2$SO$_4$) and 60 mL of water was dropwise added thereto via the dropping funnel, and stirred at 0° C. for 4 hours. 50 mL of water was added to the reaction system, then this was extracted with methylene chloride, and washed with aqueous sodium sulfite solution, water and salt water. The organic layer was dried with magnesium sulfate, and filtered to remove magnesium sulfate, and the filtrate was dried with a rotary evaporator. Using ethyl acetate/hexane=1/1 as a developing solvent, this was purified through silica gel chromatography to give 1.33 g of a white crystal of the compound (M-1) (yield, 47.8%).

The compounds produced in Production Examples 1 to 3 were used as necessary, as the starting materials in producing polymers in the following Examples.

Example 1

Production of Polymer (P-1)

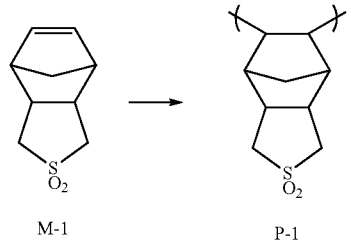

A stirrer chip was put into a 100-mL three-neck flask equipped with a thermometer, a nitrogen introducing duct and a reflux tube, and 700 mg (3.8 mmol) of the compound (M-1) was dissolved in 1.2 mL of chlorobenzene therein. With stirring this, 69 μL of a mixture of 16.9 mg (40.1 μmol) of (CH$_2$=CHCH$_2$)PdClP(CP)$_3$, 38.0 mg (114.8 μmol) of (CH$_2$=CHCH$_2$)SnBu$_3$ and 5.0 mL of methylene chloride and 69 μL of a mixture of 38.0 mg of (CH$_3$)$_3$N$^+$H(C$_6$H$_5$)B$^-$(C$_6$F$_5$)$_4$ and 5.0 mL of methylene chloride, which had been prepared previously, were added thereto, and heated and stirred in an oil bath previously heated at 80° C., for 3 hours. The reaction liquid was cooled to room temperature, then re-precipitated in methanol, and the deposited solid was collected through filtration to give the polymer (P-1).

Example 2

Production of Polymer (P-2)

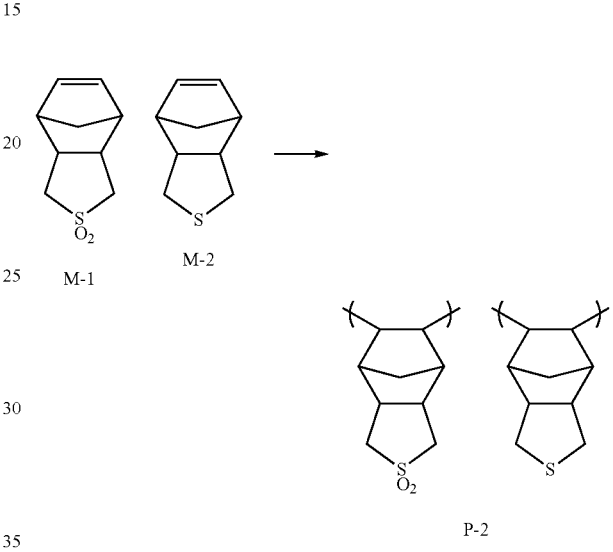

Using 1.0 g of the compound (M-1) and 1.2 g of the compound (M-2), a white solid of the polymer (P-2) was produced through polymerization in the same manner as in Example 1.

Example 3

Production of Polymer (P-3)

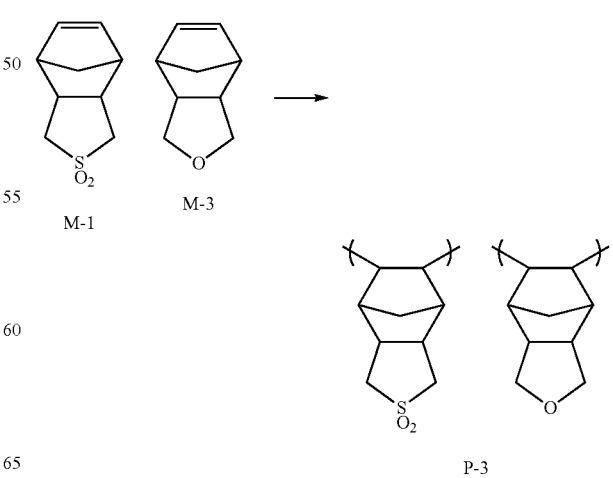

Using 1.0 g of the compound (M-1) and 1.1 g of the compound (M-3), a white solid of the polymer (P-3) was produced through polymerization in the same manner as in Example 1.

Example 4

Production of Polymer (P-4)

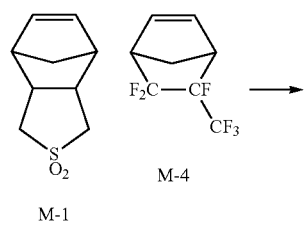

Using 1.0 g of the compound (M-1) and 1.2 g of the compound (M-4), a white solid of the polymer (P-4) was produced through polymerization in the same manner as in Example 1.

Example 5

Production of Polymer (P-5)

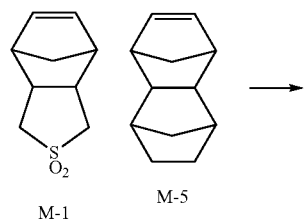

Example 6

Production of Polymer (P-6)

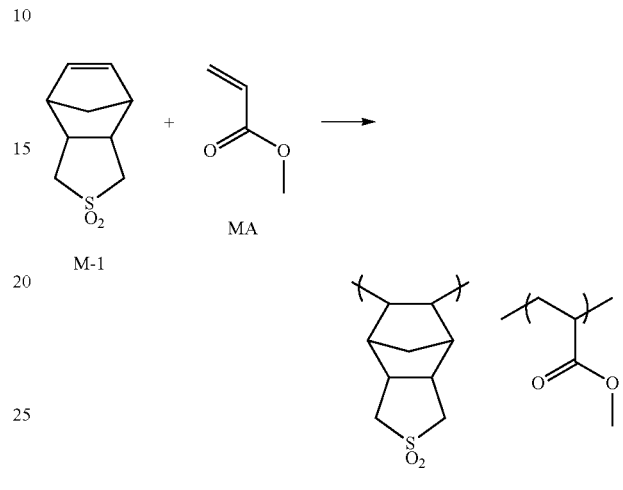

Using 2.0 g of the compound (M-1) and 0.93 g of the compound (MA), a white solid of the polymer (P-6) was produced through radical polymerization.

Comparative Example 1

Production of Polymer (P-15)

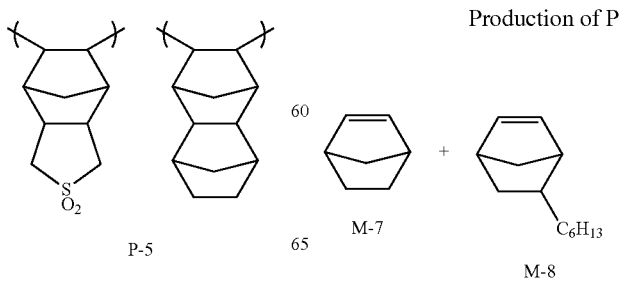

According to the method described in [0040] to [0041] in JP-A 2010-145959 and using 5.0 g of the compound (M-6), a white solid of the polymer (P-15) was produced through coordination polymerization.

Comparative Example 2

Production of Polymer (P-16)

Using 1.0 g of the compound (M-1) and 0.86 g of the compound (M-5), a white solid of the polymer (P-5) was produced through polymerization in the same manner as in Example 1.

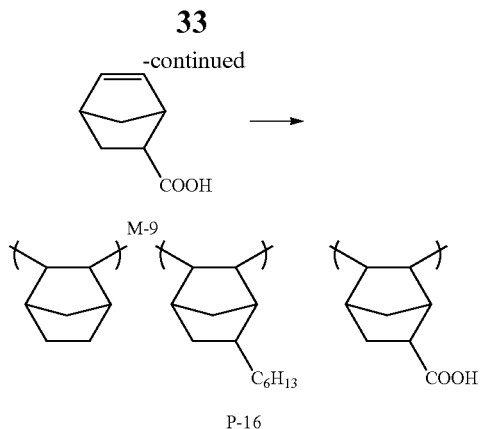

P-16

According to the method described in [0090] to [0091] in JP-A 2010-77280 and using 6.4 g of the compound (M-7), 6.4 g of the compound (M-8) and 1.1 g of the compound (M-9), a white solid of the polymer (P-16) was produced through coordination polymerization.

Comparative Example 3

Production of Polymer (P-17)

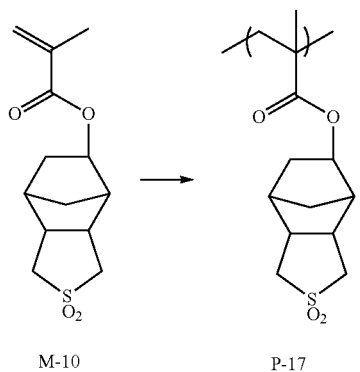

M-10 P-17

According to the method described in [0069] to [0070] in WO2006/075646 and using 5.0 g of the compound (M-10), a white solid of the polymer (P-17) was produced through radical polymerization.

Test Example 1

The refractive index, the Abbe's number, the glass transition temperature (Tg), the light transmittance and the water absorption of the polymers produced in Examples 1 to 6 were measured according to the methods mentioned below, and the results are shown in Table 1.

(1) Refractive Index:

The polymer was compression-molded under heat into a film having a thickness of 200 μm, and the refractive index of the film to a light having a wavelength of 589 nm was measured with an Abbe's refractiometer (Atago's "DR-M2").

(2) Abbe's Number:

The polymer was compression-molded under heat into a film having a thickness of 200 μm, and the refractive index of the film to a light having a wavelength of 486 nm, 589 nm or 656 nm was measured with an Abbe's refractiometer (Atago's "DR-M2"). Based on the found data, the Abbe's number of the film was computed.

(3) Product of Refractive Index and Abbe's Number:

The product of the refractive index measured in the above (1) and the Abbe's number determined in the above (2) was computed, and the sample was evaluated according to the following standards.

A: The product of refractive index and Abbe's number is 87 or more.

B: The product of refractive index and Abbe's number is from 85 to less than 87.

C: The product of refractive index and Abbe's number is less than 85.

(4) Glass Transition Temperature (Tg):

Using a differential scanning calorimeter (DSC 6200, by Seiko Instruments), the sample was analyzed in nitrogen at a heating speed of 10° C./min to determine the glass transition temperature thereof.

(5) Light Transmittance:

The polymer to be analyzed is shaped into a small piece having a thickness of 1.0 mm, and analyzed for the light transmittance thereof using a UV-visible light absorption spectrometer (Shimadzu's UV-3100).

(6) Water Absorption:

200 mg of the polymer was ground into powder, then conditioned in a constant temperature and humidity room at 25° C. and a relative humidity of 60% for 24 hours, and analyzed two times with a Karl-Fischer Volumetric Titrator (AQUACOUNTER AQV-2100, by Hiranuma Sangyo, with generator electrolyte Hydranal Aqualyte RS-A (Sigma Aldrich) and counter-electrolyte Aqualyte CN (Kanto Chemical)), and the found data were averaged to give a mean value.

TABLE 1

| | Resin | Refractive Index | Abbe's Number | Evaluation of Product | Tg | Light Transmittance | Water Absorption |
|---|---|---|---|---|---|---|---|
| Example 1 | P-1 | 1.576 | 61.3 | A | 250 | 80 | 1.0 |
| Example 2 | P-2 | 1.601 | 54.5 | A | 230 | 80 | 0.3 |
| Example 3 | P-3 | 1.581 | 59.9 | A | 230 | 85 | 0.4 |
| Example 4 | P-4 | 1.500 | 70.5 | A | 220 | 90 | 0.2 |
| Example 5 | P-5 | 1.586 | 59.1 | A | 220 | 90 | 0.3 |
| Example 6 | P-6 | 1.525 | 56.0 | B | 240 | 90 | 1.6 |
| Comparative Example 1 | P-15 | 1.484 | 66.8 | A | 240 | 80 | 0.2 |
| Comparative Example 2 | P-16 | 1.531 | 55.0 | C | 230 | 80 | 0.6 |
| Comparative Example 3 | P-17 | 1.524 | 60.0 | A | 150 | 90 | 1.8 |

(Note)
In the above Table, "evaluation of product" means the result of evaluation of the product of the refractive index and the Abbe's number.

As obvious from the results in Table 1, the polymers of the invention are all on a satisfactory level in point of all the refractive index, the Abbe's number, the product of the refractive index and the Abbe's number, Tg, the light transmittance and the water absorption thereof (Examples 1 to 6). The polymers of Examples 1 to 5 are more favorable than the polymer of Example 6 in that the product of the refractive index and the Abbe's number thereof is large and the water absorption thereof is small; and the polymers of Examples 2 to 5 are further more favorable. The polymer of Comparative Example 1 is not good in point of the refractive index thereof; the polymer of Comparative Example 2 is not good in point of the product of the refractive index and the Abbe's number thereof; and the polymer of Comparative Example 3 is not good in point of the water absorption thereof.

Example 10

Production of Polymer (P-8)

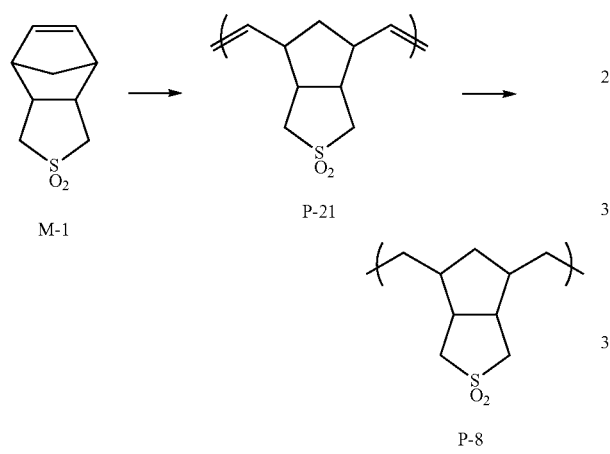

P-8

Dry nitrogen was introduced into a Schlenk tube that had been dried under reduced pressure in an oil bath at 150° C. for 15 minutes, then cooled to room temperature, and thereafter 0.5 mg (0.6 μmol) of a second-generation Grubbs catalyst, 320 μl of dry chloroform and 8.2 mg (0.06 mmol) of phenylvinyl sulfide were put and mixed therein to prepare a metathesis polymerization catalyst. A 100-mL three-neck flask equipped with a nitrogen introducing duct-fitted reflux tube, a septum rubber and a stopper was dried under reduced pressure in an oil bath at 150° C. for 15 minutes, then cooled to room temperature, and thereafter 1.1 g (6.0 mmol) of the compound (M-1) and 5.5 mL of dry chloroform were put thereinto and heated and stirred in an oil bath at 60° C. for 30 minutes. 390 μl of the previously prepared metathesis polymerization catalyst was added thereto, and heated and stirred at 60° C. for 4 hours. The reaction liquid was cooled to room temperature, then reprecipitated in methanol, and the deposited solid was collected through filtration and dried to give 1.08 g of the metathesis polymer (P-21) (yield, 98.2%).

A 100-mL three-neck flask equipped with a nitrogen introducing duct-fitted reflux tube, a thermometer and a septum rubber and provided with a stirrer chip put therein was dried under reduced pressure in an oil bath at 150° C. for 15 minutes, then cooled to room temperature, and thereafter 1.03 g of metathesis polymer (P-21) and 37 mL of o-dichlorobenzene were added thereto and stirred at room temperature to thereby completely dissolve the polymer. 5.2 g (28.0 mmol) of p-toluenesulfonyl hydrazide and 3.6 g (28.0 mmol) of N,N'-dimethylchlorohexylamine were added thereto, and heated and stirred at 110° C. for 4 hours. The reaction liquid was cooled to room temperature, then reprecipitated in methanol, and the deposited white solid was collected and dried in vacuum at 100° C. for 5 hours to give 0.97 g of the polymer (P-8).

Example 11

Production of Polymer (P-9)

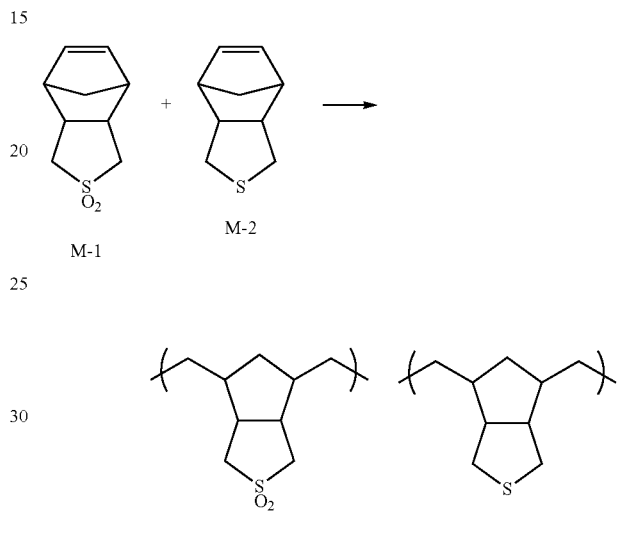

P-9

A white solid of the polymer (P-9) was produced through polymerization in the same manner as in Example 10 and using 1.0 g of the compound (M-1) and 1.2 g of the compound (M-2).

Example 12

Production of Polymer (P-10)

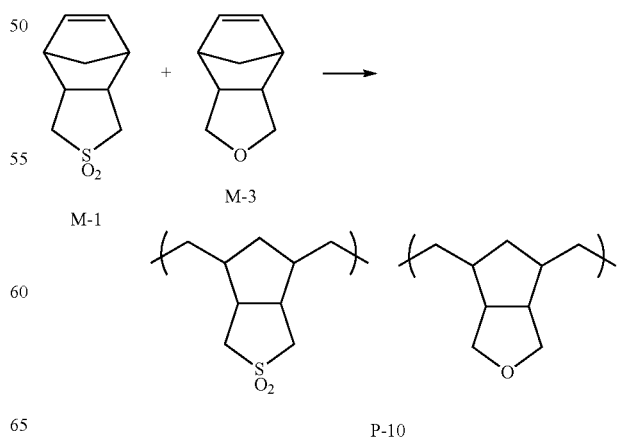

P-10

A white solid of the polymer (P-10) was produced through polymerization in the same manner as in Example 10 and using 1.0 g of the compound (M-1) and 1.1 g of the compound (M-3).

Example 13

Production of Polymer (P-11)

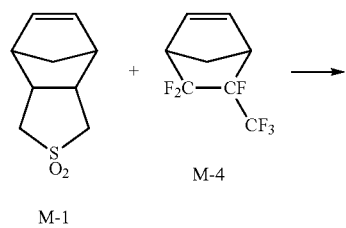

A white solid of the polymer (P-11) was produced through polymerization in the same manner as in Example 10 and using 1.0 g of the compound (M-1) and 1.2 g of the compound (M-4).

Example 14

Production of Polymer (P-12)

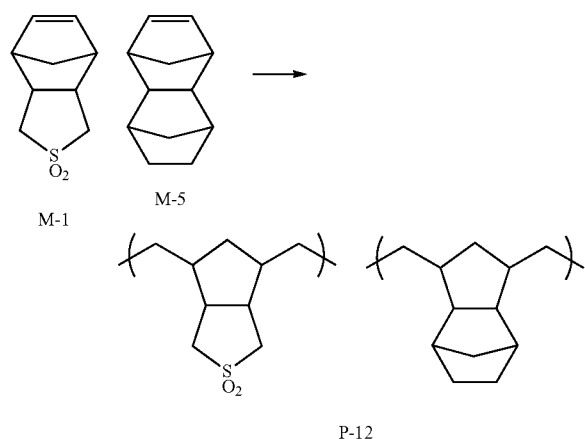

A white solid of the polymer (P-12) was produced through polymerization in the same manner as in Example 10 and using 1.0 g of the compound (M-1) and 0.86 g of the compound (M-5).

Example 15

Production of Polymer (P-13)

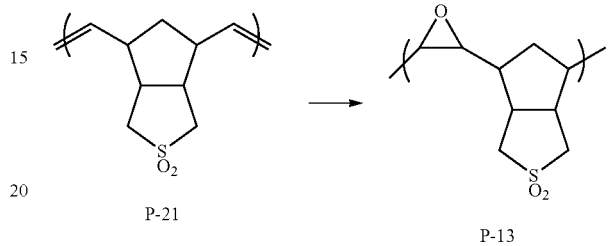

3.0 g of the compound (P-21) produced in Example 10, 60 mL of methanol and 60 mL of chlorobenzene were put into a 200-mL three-neck flask equipped with a thermometer, a nitrogen introducing duct-fitted air-cooled tube and a 100-mL dropping funnel and provided with a stirrer chip put therein, and cooled to 0° C. An aqueous solution prepared by mixing 13.9 g (22.7 mmol) of Oxone (registered trademark, $2KHSO_5 \cdot KHSO_4 \cdot K_2SO_4$) and 60 mL of water was dropwise added thereto via the dropping funnel, and stirred under reflux for 4 hours. After cooled to room temperature, this was reprecipitated in methanol to give the polymer (P-13).

Comparative Example 10

Production of Polymer (P-14)

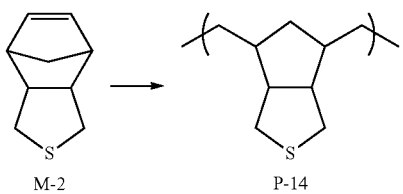

A white solid of the polymer (P-14) was produced through polymerization in the same manner as in Example 10 and using 3.0 g of the compound (M-2).

Test Example 2

The refractive index, the Abbe's number, the glass transition temperature (Tg), the light transmittance and the water absorption of the polymers produced in Examples 10 to 14 and Comparative Example 10 were measured according to the same methods as in Text Example 1, and the results are shown in Table 2.

TABLE 2

| | Resin | Refractive Index | Abbe's Number | Evaluation of Product | Tg | Light Transmittance | Water Absorption |
|---|---|---|---|---|---|---|---|
| Example 10 | P-8 | 1.545 | 64.8 | A | 125 | 80 | 1.0 |
| Example 11 | P-9 | 1.561 | 56.3 | A | 110 | 85 | 0.3 |
| Example 12 | P-10 | 1.536 | 61.0 | A | 95 | 85 | 0.4 |
| Example 13 | P-11 | 1.480 | 70.3 | A | 130 | 90 | 0.2 |
| Example 14 | P-12 | 1.569 | 60.5 | A | 105 | 90 | 0.3 |
| Example 15 | P-13 | 1.587 | 60.3 | A | 120 | 80 | 1.3 |
| Comparative Example 10 | P-14 | 1.583 | 46.0 | C | 125 | 80 | 0.2 |

(Note)
In the above Table, "evaluation of product" means the result of evaluation of the product of the refractive index and the Abbe's number.

As obvious from the results in Table 2, the polymers of the invention are all on a satisfactory level in point of all the refractive index, the Abbe's number, the product of the refractive index and the Abbe's number, Tg, the light transmittance and the water absorption thereof (Examples 10 to 15). As opposed to these, the polymer of Comparative Example 10 is poor in practicability since the Abbe's number thereof is significantly low.

Example 18

Molding of Polymer (P-9)

A powder of the polymer (P-9) produced in Example 11 was put into a heated mold, and compression-molded therein at 160° C. into a molded article, lens having a diameter of 8 mm and a thickness of 1 mm.

When the melt viscosity thereof is low, the polymer may be melt-molded. For example, a resin powder is put into a test tube having an outer diameter of 20 mm, melted under heat, cooled, then cut and polished into a molded article, lens.

The polymer of the invention has a high refractivity, a high Abbe's number, a high-level heat resistance, a high-level light transmittance and a low water absorption. Accordingly, the polymer of the invention is useful as various shaped articles of such as typically optical parts. According to the production method of the invention, the polymer of the invention can be produced in a simplified manner. Therefore, the industrial applicability of the invention is great.

While the present invention has been described in detail and with reference to specific embodiments thereof, it will be apparent to one skilled in the art that various changes and modifications can be made therein without departing from the spirit and scope thereof.

The present disclosure relates to the subject matter contained in Japanese Patent Application No. 2010-185530, filed on Aug. 20, 2010, the contents of which are expressly incorporated herein by reference in their entirety. All the publications referred to in the present specification are also expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. A polymer containing a recurring unit having an aliphatic polycyclic structure, wherein at least two atoms constituting the ring skeleton of the aliphatic polycyclic structure constitute the main chain of the polymer, and the aliphatic polycyclic structure has a five-membered aliphatic ring containing a sulfonyl group in the ring skeleton, which is represented by the following formula (A):

(A)

and further containing a second recurring unit selected from the group consisting of recurring units represented by the following formulas (21), (22), (23), (24) and (25), in addition to the above recurring unit having an aliphatic polycyclic structure:

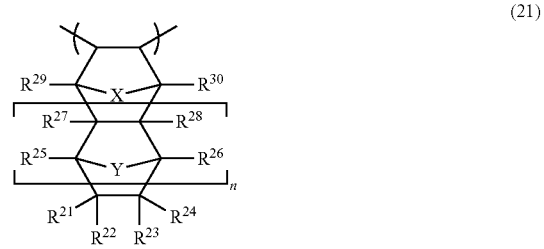

(21)

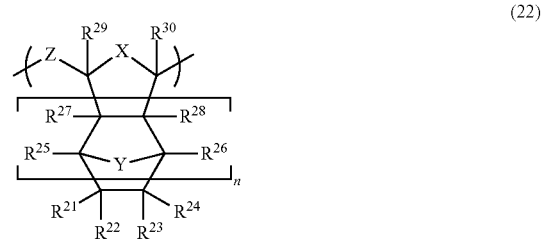

(22)

wherein $R^{21}$ to $R^{30}$ each independently represent a hydrogen atom or a substituent and at least two of $R^{21}$ to $R^{30}$ may bond to each other to form a ring; X and Y each independently represent any of —$CH_2$—, a thioether group, an ether group or a sulfonyl group; Z represents —$CH_2$—$CH_2$—, a vinylene group or a vinyleneoxy group; n indicates an integer of from 0 to 2; and when n is 2, two Y's, two $R^{25}$'s, two $R^{26}$'s, two $R^{27}$'s and two $R^{28}$'s each may be the same or different;

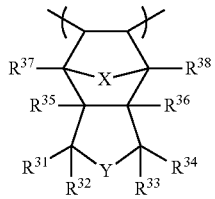
(23)

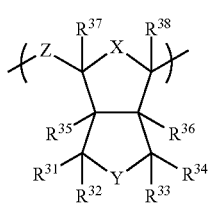
(24)

wherein $R^{31}$ to $R^{38}$ each independently represent a hydrogen atom or a substituent, and at least two of $R^{31}$ to $R^{38}$ may bond to each other to form a ring; X and Y each independently represent any of —CH$_2$—, a thioether group or an ether group with the proviso that any one of X and Y is a thioether group or an ether group; and Z represents —CH$_2$—CH$_2$—, a vinylene group or a vinyleneoxy group;

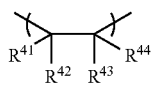
(25)

wherein $R^{41}$ to $R^{44}$ each independently represent a hydrogen atom, a halogen atom, an alkyl group or a halogenoalkyl group, provided that at least one of $R^{41}$ to $R^{44}$ is not a hydrogen atom; and any of $R^{41}$ or $R^{42}$, and any of $R^{43}$ or $R^{44}$ may bond to each other to form a ring.

2. The polymer according to claim 1, wherein the main chain of the polymer contains —CH$_2$—CH$_2$—, a vinylene group or a vinyleneoxy group, in addition to the at least two atoms constituting the ring skeleton of the aliphatic polycyclic structure.

3. The polymer according to claim 1, which also contains a recurring unit having an aliphatic ring structure in addition to the recurring unit having an aliphatic polycyclic structure and the second recurring unit.

4. The polymer according to claim 1, wherein the recurring unit having an aliphatic polycyclic structure is represented by the following formula (1):

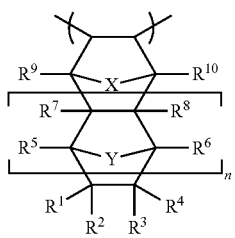
(1)

wherein $R^1$ to $R^{10}$ each independently represent a hydrogen atom or a substituent, and any of $R^1$ and $R^2$, and any of $R^3$ and $R^4$ bond to each other to form the five-membered ring of formula (A);

X and Y each independently represent any of —CH$_2$—, a thioether group, an ether group or a sulfonyl group; and n indicates an integer of from 0 to 2; and when n is 2, two Y's, two $R^5$'s, two $R^6$'s, two $R^7$'s and two $R^8$'s each may be the same or different.

5. The polymer according to claim 4, wherein in the formula (21) and the formula (22), n is 0 (zero), and at least one of $R^{21}$ to $R^{24}$, $R^{29}$ and $R^{30}$ is a fluorine atom or a fluoroalkyl group, or at least two of $R^{21}$ to $R^{24}$ bonds to each other to form a ring containing a fluorine atom, an oxygen atom or a sulfur atom.

6. The polymer according to claim 4, wherein the recurring unit represented by the formulae (21) or (22) contains a fluorine atom, a thioether group or an ether group.

7. The polymer according to claim 1, having a number-average molecular weight of from 1000 to 500000.

8. A polymer produced by polymerizing a polymerizing monomer represented by the following formula (31) and a polymerizing monomer represented by the following formula (42):

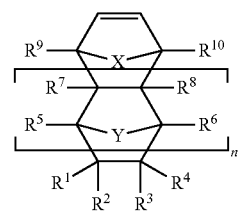
(31)

wherein $R^1$ to $R^{10}$ each independently represent a hydrogen atom or a substituent, and any of $R^1$ and $R^2$, and any of $R^3$ and $R^4$ bond to each other to form a sulfonyl group-containing five-membered aliphatic ring represented by the following formula (A):

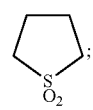
(A)

X and Y each independently represent any of —CH$_2$—, a thioether group, an ether group or a sulfonyl group;

n indicates an integer of from 0 to 2; and when n is 2, two Y's, two $R^5$'s, two $R^6$'s, two $R^7$'s and two $R^8$'s each may be the same or different; and at least one of X and Y is a sulfonyl group,

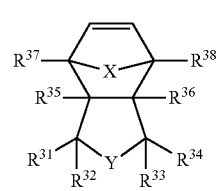
(42)

wherein $R^{31}$ to $R^{38}$ each independently represent a hydrogen atom or a substituent, and at least two of $R^{31}$ to $R^{38}$ may bond to each other to form a ring; and X and Y each independently represent any of —$CH_2$—, a thioether group or an ether group with the proviso that any one of X and Y is a thioether group or an ether group.

9. A resin composition for optical material, comprising a polymer containing a recurring unit having an aliphatic polycyclic structure, wherein at least two atoms constituting the ring skeleton of the aliphatic polycyclic structure constitute the main chain of the polymer, and the aliphatic polycyclic structure has a five-membered aliphatic ring containing a sulfonyl group in the ring skeleton, which is represented by the following formula (A):

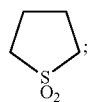
(A)

and said polymer further containing a second recurring unit represented by the following formula (23) or the following formula (24), in addition to the above recurring unit having an aliphatic polycyclic structure:

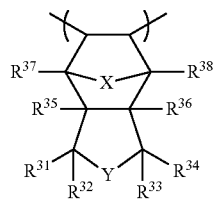
(23)

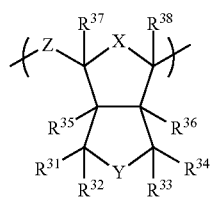
(24)

wherein $R^{31}$ to $R^{38}$ each independently represent a hydrogen atom or a substituent, and at least two of $R^{31}$ to $R^{38}$ may bond to each other to form a ring; X and Y each independently represent any of —$CH_2$—, a thioether group or an ether group with the proviso that any one of X and Y is a thioether group or an ether group; and Z represents —$CH_2$—$CH_2$—, a vinylene group or a vinyleneoxy group.

10. A shaped article, comprising a polymer containing a recurring unit having an aliphatic polycyclic structure, wherein at least two atoms constituting the ring skeleton of the aliphatic polycyclic structure constitute the main chain of the polymer, and the aliphatic polycyclic structure has a five-membered aliphatic ring containing a sulfonyl group in the ring skeleton, which is represented by the following formula (A):

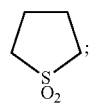
(A)

and said polymer further containing a second recurring unit represented by the following formula (23) or the following formula (24), in addition to the above recurring unit having an aliphatic polycyclic structure:

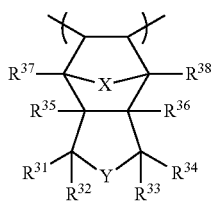
(23)

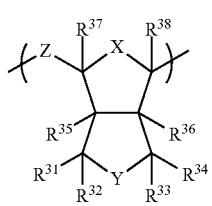
(24)

wherein $R^{31}$ to $R^{38}$ each independently represent a hydrogen atom or a substituent, and at least two of $R^{31}$ to $R^{38}$ may bond to each other to form a ring; X and Y each independently represent any of —$CH_2$—, a thioether group or an ether group with the proviso that any one of X and Y is a thioether group or an ether group; and Z represents —$CH_2$—$CH_2$—, a vinylene group or a vinyleneoxy group.

11. An optical material, comprising a polymer containing a recurring unit having an aliphatic polycyclic structure, wherein at least two atoms constituting the ring skeleton of the aliphatic polycyclic structure constitute the main chain of the polymer, and the aliphatic polycyclic structure has a five-membered aliphatic ring containing a sulfonyl group in the ring skeleton, which is represented by the following formula (A):

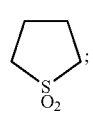
(A)

and said polymer further containing a second recurring unit represented by the following formula (23) or the following formula (24), in addition to the above recurring unit having an aliphatic polycyclic structure:

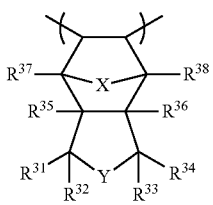
(23)

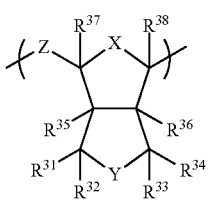
(24)

wherein $R^{31}$ to $R^{38}$ each independently represent a hydrogen atom or a substituent, and at least two of $R^{31}$ to $R^{38}$ may bond to each other to form a ring; X and Y each independently represent any of —$CH_2$—, a thioether group or an ether group with the proviso that any one of X and Y is a thioether group or an ether group; and Z represents —$CH_2$—$CH_2$—, a vinylene group or a vinyleneoxy group.

12. A lens, comprising a polymer containing a recurring unit having an aliphatic polycyclic structure, wherein at least two atoms constituting the ring skeleton of the aliphatic polycyclic structure constitute the main chain of the polymer, and the aliphatic polycyclic structure has a five-membered aliphatic ring containing a sulfonyl group in the ring skeleton, which is represented by the following formula (A):

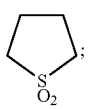
(A)

and said polymer further containing a second recurring unit represented by the following formula (23) or the following formula (24), in addition to the above recurring unit having an aliphatic polycyclic structure:

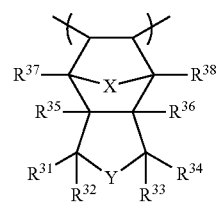
(23)

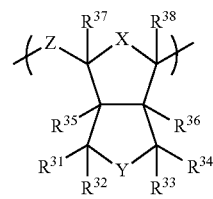
(24)

wherein $R^{31}$ to $R^{38}$ each independently represent a hydrogen atom or a substituent, and at least two of $R^{31}$ to $R^{38}$ may bond to each other to form a ring; X and Y each independently represent any of —$CH_2$—, a thioether group or an ether group with the proviso that any one of X and Y is a thioether group or an ether group; and Z represents —$CH_2$—$CH_2$—, a vinylene group or a vinyleneoxy group.

\* \* \* \* \*